(12) United States Patent
Park

(10) Patent No.: US 11,511,591 B2
(45) Date of Patent: Nov. 29, 2022

(54) DEVICE FOR ADJUSTING HEIGHT OF VEHICLE

(71) Applicant: HYUNDAI MOBIS CO., LTD., Seoul (KR)

(72) Inventor: Kyung Ryul Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 252 days.

(21) Appl. No.: 16/740,470

(22) Filed: Jan. 12, 2020

(65) Prior Publication Data

US 2021/0061044 A1 Mar. 4, 2021

(30) Foreign Application Priority Data

Aug. 29, 2019 (KR) ........................ 10-2019-0106301

(51) Int. Cl.
*B60G 17/056* (2006.01)
*B60G 11/26* (2006.01)

(52) U.S. Cl.
CPC .......... *B60G 17/0565* (2013.01); *B60G 11/26* (2013.01); *B60G 2500/30* (2013.01)

(58) Field of Classification Search
CPC .... B60G 17/0565; B60G 17/04; B60G 11/26; B60G 15/062; B60G 2500/30; F16F 9/3207; F16F 9/3235; F15B 15/1419
See application file for complete search history.

(56) References Cited

U.S. PATENT DOCUMENTS

| | | | | |
|---|---|---|---|---|
| 2,552,549 A * | 5/1951 | Good | ..................... | A01B 63/22 280/43.23 |
| 2,899,938 A * | 8/1959 | Gardner | ................... | B66F 9/22 92/136 |
| 3,765,498 A * | 10/1973 | Rogerson | ............... | B62M 27/02 180/190 |
| 3,891,236 A * | 6/1975 | Kuwano | ................... | B62J 1/06 267/132 |
| 3,977,485 A * | 8/1976 | West | ....................... | B62B 17/04 280/21.1 |
| 9,222,537 B2 * | 12/2015 | Peuker | ...................... | F16F 7/08 |
| 10,118,455 B1 * | 11/2018 | Lambert | .............. | B60G 15/063 |
| 2016/0159191 A1 * | 6/2016 | Seminara | ............ | B60G 15/063 267/218 |
| 2016/0221410 A1 * | 8/2016 | Mersmann | ......... | B60G 17/0157 |

\* cited by examiner

*Primary Examiner* — Frank B Vanaman
(74) *Attorney, Agent, or Firm* — H.C. Park & Associates, PLC

(57) ABSTRACT

A vehicle height adjustment system includes: a cylinder housing part having an inner space configured to receive working fluid; a piston part positioned in the cylinder housing part, the piston part configured to move linearly, in response to a working fluid, in a moving direction along the cylinder housing part; and a rotation suppressing bracket coupled to the cylinder housing part and connected to a side surface of the piston part, the rotation suppressing bracket configured to suppress rotational movement with respect to the moving direction of the piston part.

13 Claims, 52 Drawing Sheets

High mode

Low mode

DEVICE FOR ADJUSTING HEIGHT OF VEHICLE

CROSS-REFERENCES TO RELATED APPLICATIONS

This application claims priority from and the benefit of Korean Patent Application No. 10-2019-0106301 filed on Aug. 29, 2019, which is hereby incorporated by reference for all purposes as if set forth herein.

BACKGROUND

Field

Exemplary embodiments relate to a vehicle height adjustment system, and more particularly, a vehicle height adjustment system that is capable of preventing or reducing rotation of a piston part.

Discussion of the Background

A suspension system conventionally includes a suspension spring and a shock absorber to improve the quality of driving experience by absorbing various types of vibrations or impacts transferred from a road surface.

In the conventional suspension system, the suspension spring may include a leaf spring, a coil suspension spring, an air suspension, or the like. Among them, the air suspension may have an advantage that the height of the vehicle may be constantly maintained or adjusted. On the other hand, the air suspension additionally requires a device for adjusting an amount of air depending on conditions, such as a load, a device for compressing air, and the like. Therefore, the use of air suspension is generally restricted to large vehicles such as a bus or a luxury passenger vehicle.

A conventional vehicle height adjustment system may have a problem of increased number of parts and thus increased manufacturing cost. Also, a piston part conventionally used in a suspension system does not include a separate device for preventing or reducing its rotation. Such unnecessary rotation caused by applying the vehicle height adjustment system may degrade the overall durability of the damper rod.

The above information disclosed in this Background section is only for enhancement of understanding of the background of the invention and, therefore, it may contain information that does not constitute prior art.

SUMMARY

Exemplary embodiments of the present invention provide a vehicle height adjustment system capable of preventing or reducing the rotation of a piston part and thereby improving the durability of parts. The vehicle height adjustment system according to the exemplary embodiments of the present invention may also reduce the number of parts and reduce the manufacturing cost.

Additional features of the invention will be set forth in the description which follows, and in part will be apparent from the description, or may be learned by practice of the invention.

According to one or more exemplary embodiments, a vehicle height adjustment system includes: a cylinder housing part having an inner space configured to receive working fluid; a piston part positioned in the cylinder housing part, the piston part configured to move linearly, in response to a working fluid, in a moving direction along the cylinder housing part; and a rotation suppressing bracket coupled to the cylinder housing part and connected to a side surface of the piston part, the rotation suppressing bracket configured to suppress rotational movement with respect to the moving direction of the piston part.

The piston part may include: a piston body positioned in the cylinder housing part and configured to move linearly in the moving direction; and a side engagement groove part formed on a side surface of the piston body having a groove shape extending along the moving direction of the piston body.

The rotation suppressing bracket may include a protrusion formed on the side surface of the piston part, the protrusion inserted into the side engagement groove part.

The rotation suppressing bracket may include: a bracket body having a shape of a ring which is brought into contact with an end of the cylinder housing part; and a first engagement protrusion extending from the bracket body and inserted into the side engagement groove part.

The first engagement protrusion may include a plurality of first engagement protrusion parts extending from the bracket body.

The cylinder housing part may include a fastening groove part formed on the end of the cylinder housing part, and wherein the rotation suppressing bracket may further include: a second engagement protrusion extending from the bracket body, and inserted into and engaged in the fastening groove part.

The second engagement protrusion may include a plurality of second engagement protrusion parts extending from the bracket body.

The vehicle height adjustment system may further include: an output cover fastened to the cylinder housing part while surrounding the rotation suppressing bracket.

The vehicle height adjustment system may further include a damper rod positioned in the piston part, the damper rod including a protrusion part protruding from the damper rod, and the piston part may further include a guide part formed to have a groove shape facing the protrusion part, and the protrusion part may be inserted into the guide part.

The protrusion part inserted into the guide part may be configured to suppress rotational movement of the damper rod with respect to the moving direction.

According to one or more exemplary embodiments, a vehicle height adjustment system includes: an output unit connected to a vehicle body for reducing vibration, the output unit configured to change its length in response to transfer of working fluid to adjust a height of the vehicle body with respect to ground; a connection pipe connected to the output unit; and an input unit connected to the connection pipe, the input unit configured to supply the working fluid to the output unit through the connection pipe, wherein the output unit includes: a cylinder housing part having an inner space configured to receive the working fluid; a piston part positioned in the cylinder housing part, the piston part configured to move linearly in a moving direction in response to the working fluid transferred to the cylinder housing part, the piston part including: a groove shape formed on a side surface thereof, extending along the moving direction thereof; and a rotation suppressing bracket coupled to the cylinder housing part, the rotation suppressing bracket including a protrusion formed on the side surface of the piston part, the protrusion inserted into the groove shape.

The output unit may include at least one of: a front wheel output unit configured to adjust a height of a front wheel-side vehicle body; and a rear wheel output unit configured to adjust a height of a rear wheel-side vehicle body.

The input unit may include: an input piston housing part containing the working fluid; and an input piston part configured to move in a vertical direction to transfer the working fluid between the input unit and the output unit.

The input unit may further include: a driving part configured to generate rotational power for driving the input piston; and a reduction part connected between the driving part and the input piston, the reduction part configured to generate a torque by increasing the rotational power of the driving part and transmit the torque to the input piston part.

The input unit may further include: a lead nut part configured to receive the torque from the reduction part and rotate in response to the received torque; and a lead screw rotatably coupled to the lead nut part and connected to the input piston part, the lead screw may be configured to move in the vertical direction in response to the rotation of the lead nut part to move the input piston part in the vertical direction.

The vehicle height adjustment system may further include a replenishment unit connected to the input unit, the replenishment unit configured to supply the working fluid into the input unit.

The vehicle height adjustment system may further include a supply pipe connected between the input unit and the replenishment unit, and the replenishment unit may be configured to supply the working fluid into the input unit through the supply pipe in response to a negative pressure formed in the input unit due to a leakage of the working fluid from operation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
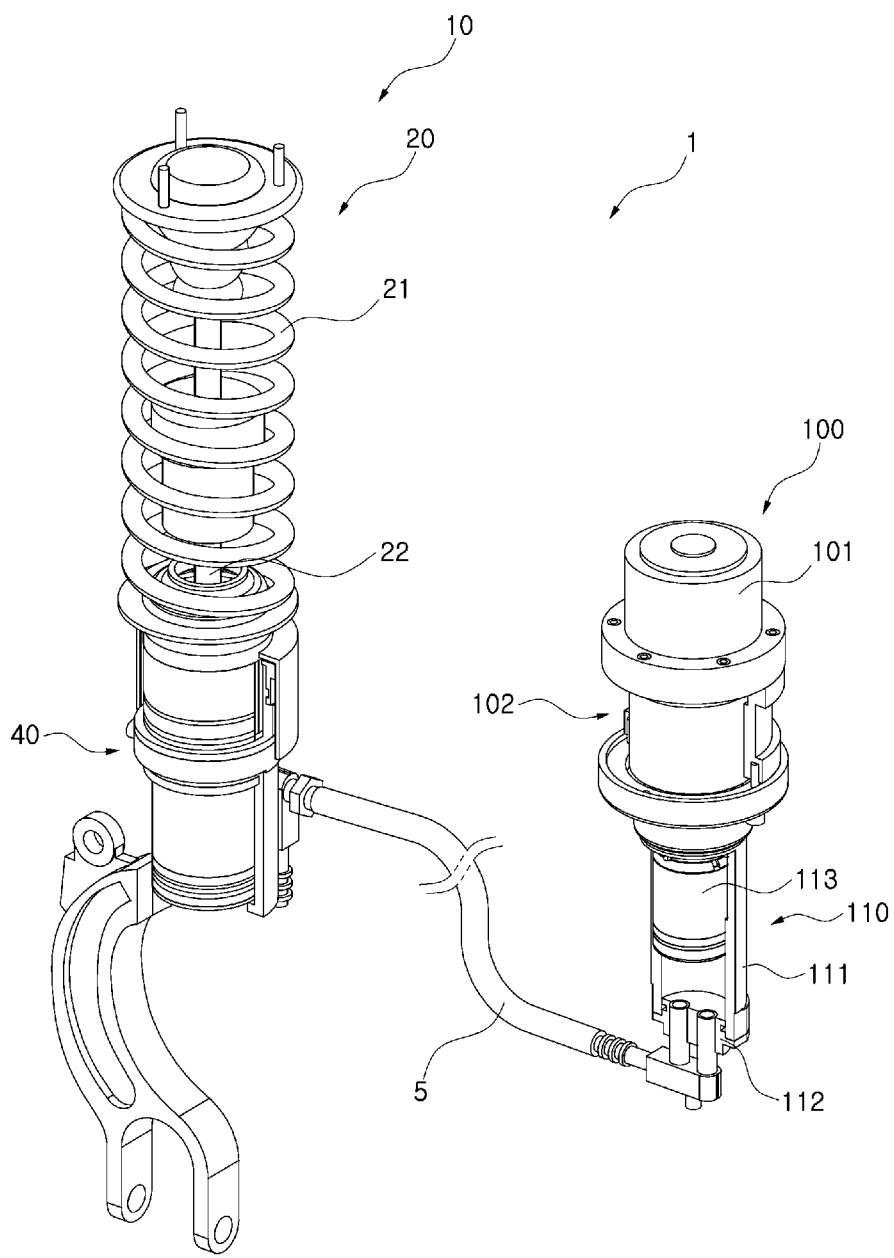
FIG. 1 is a perspective view illustrating a vehicle height adjustment system in accordance with an exemplary embodiment of the disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Figure 2:
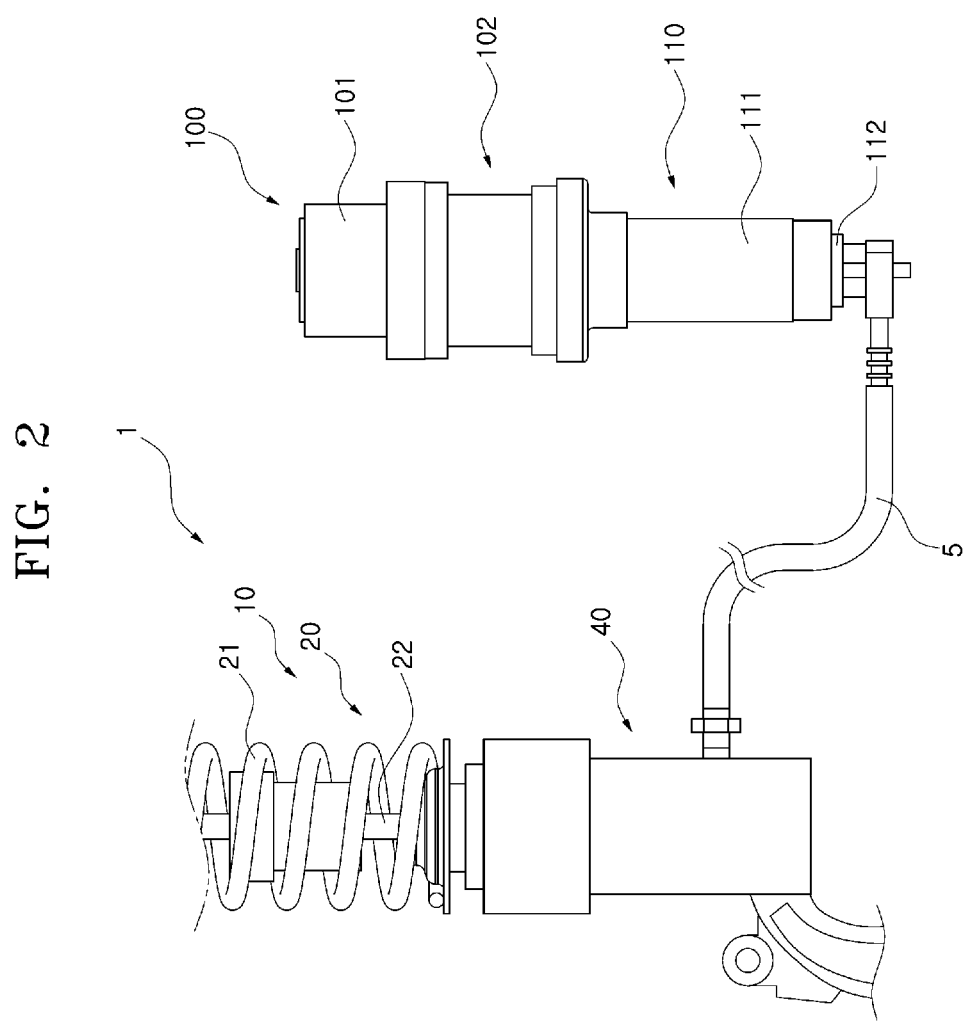
FIG. 2 is a front view of the vehicle height adjustment system in accordance with the exemplary embodiment of the disclosure.
Figure 3:
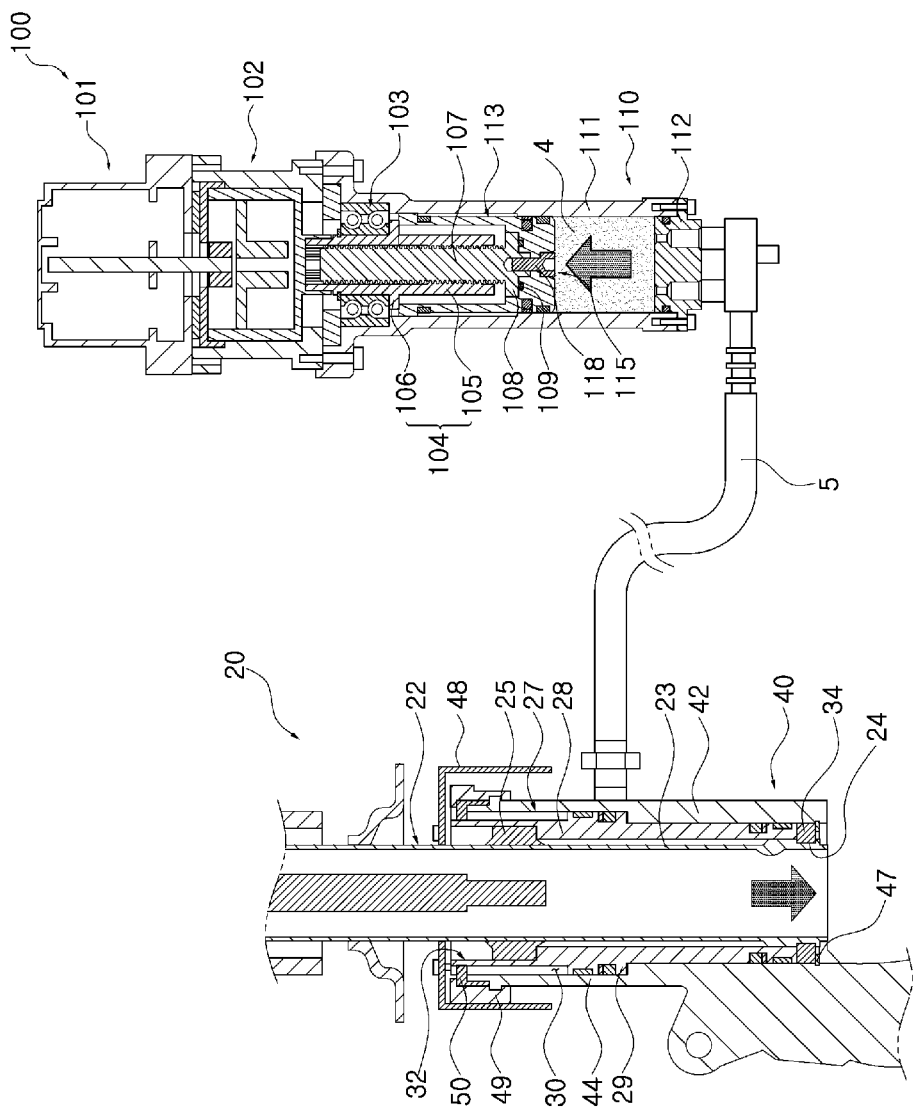
FIG. 3 is a cross-sectional view illustrating a process of the vehicle height adjustment system in accordance with the exemplary embodiment of the disclosure in a low mode.
Figure 4:
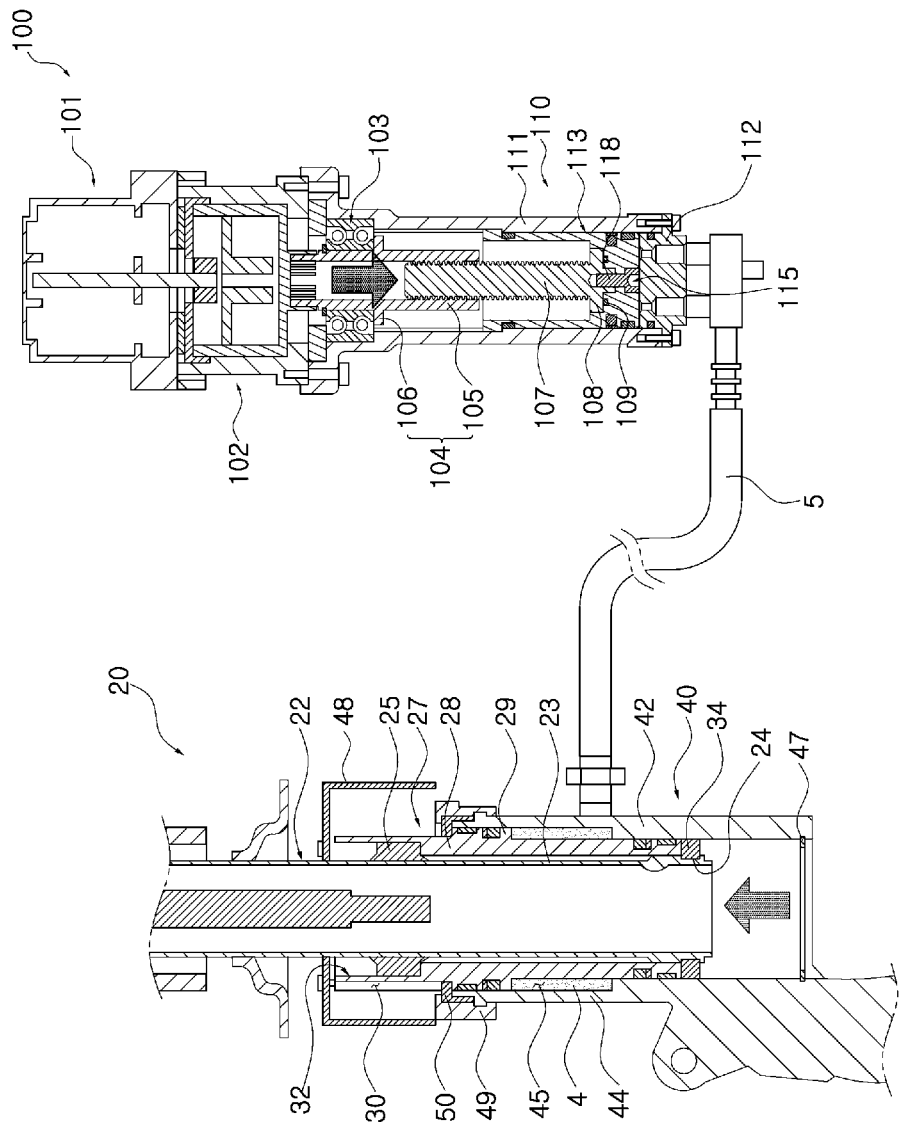
FIG. 4 is a cross-sectional view illustrating a process of the vehicle height adjustment system in accordance with the exemplary embodiment of the disclosure in a high mode.
Figure 5:
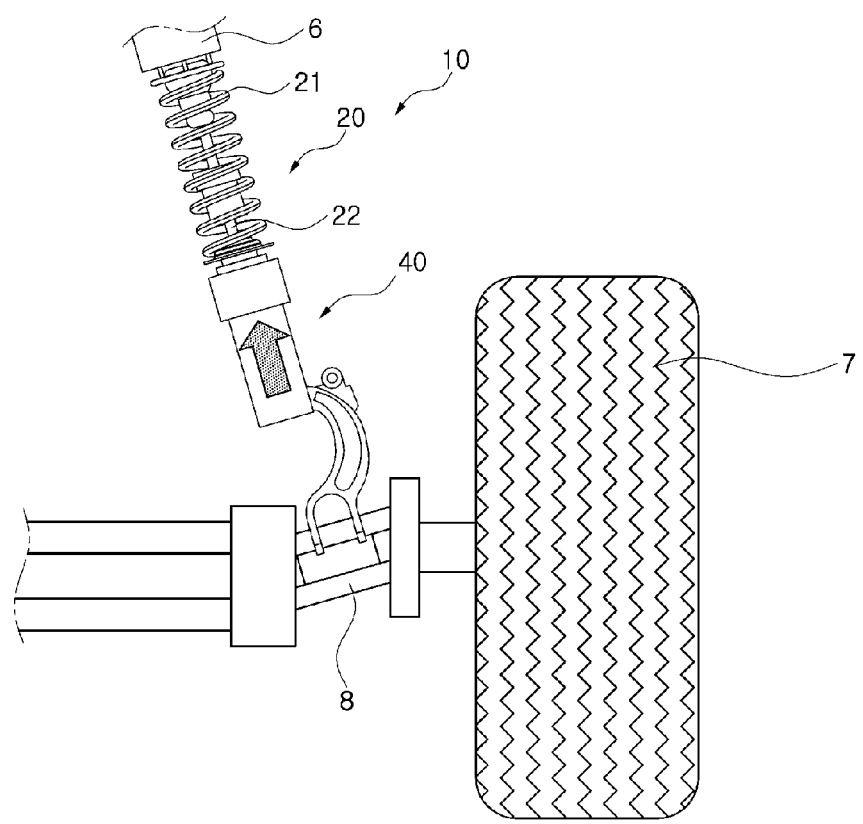
FIG. 5 is a view illustrating a process of increasing the length of an output unit in accordance with the exemplary embodiment of the disclosure to increase the height of a vehicle body.
Figure 6:
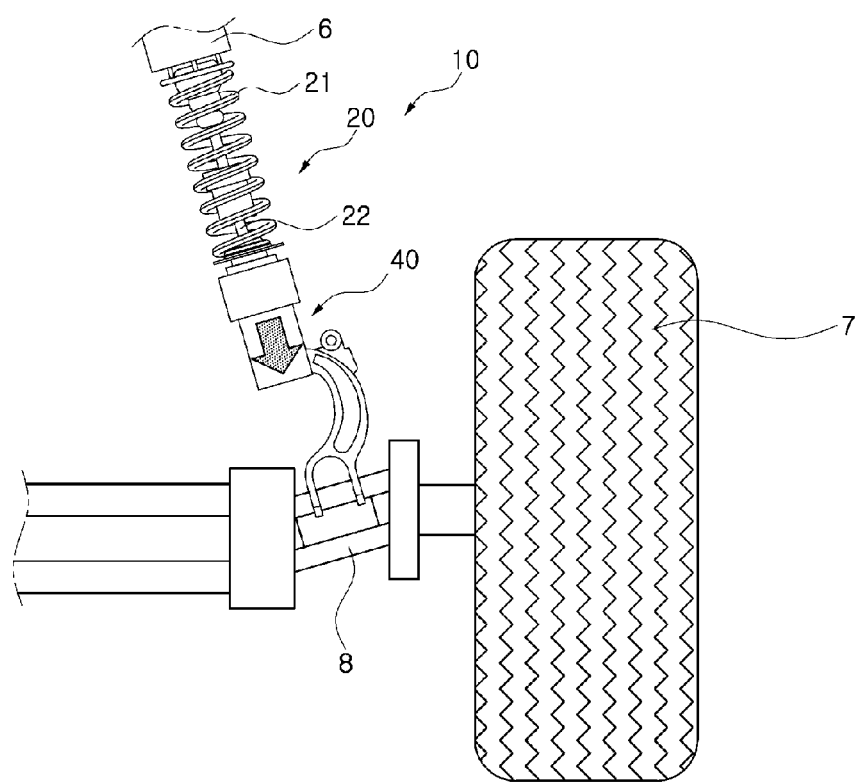
FIG. 6 is a view illustrating a process of reducing the length of the output unit in accordance with the exemplary embodiment of the disclosure to reduce the height of the vehicle body.
Figure 52:
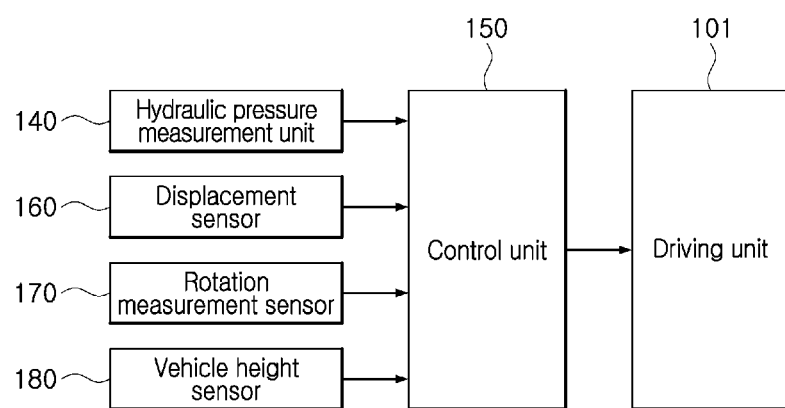
FIG. 52 is a block diagram of the vehicle height adjustment system in accordance with the exemplary embodiment of the disclosure.

FIG. 1 is a perspective view illustrating a vehicle height adjustment system in accordance with an exemplary embodiment of the disclosure, FIG. 2 is a front view of the vehicle height adjustment system in accordance with the exemplary embodiment of the disclosure, FIG. 3 is a cross-sectional view illustrating a process of the vehicle height adjustment system in accordance with the exemplary embodiment of the disclosure in a low mode, FIG. 4 is a cross-sectional view illustrating a process of the vehicle height adjustment system in accordance with the exemplary embodiment of the disclosure in a high mode, FIG. 5 is a view illustrating a process of increasing the length of an output unit 10 in accordance with the exemplary embodiment of the disclosure to increase the height of a vehicle body, FIG. 6 is a view illustrating a process of reducing the length of the output unit 10 in accordance with the exemplary embodiment of the disclosure to reduce the height of the vehicle body, and FIG. 52 is a block diagram of the vehicle height adjustment system in accordance with the exemplary embodiment of the disclosure.

As illustrated in FIGS. 1, 2, 3, 4, 5, and 6 and 52, a device 1 for adjusting a height of a vehicle in accordance with an exemplary embodiment of the disclosure includes an output unit 10, an input unit 100, a replenishment unit 130, a stiffness adjustment unit 200, a hydraulic pressure measurement unit 140, a control unit 150, a displacement sensor 160, a rotation measurement sensor 170, and a vehicle height sensor 180.

The output unit 10 may have various shapes without departing from a technical idea that the output unit 10 is connected to a vehicle body 6 to reduce vibration and the length of the output unit 10 is changed due to transfer of working fluid 4 to adjust the height of the vehicle body 6 with respect to the ground. The output unit 10 in accordance with the exemplary embodiment includes at least any one of a front wheel output unit 20 which adjusts the height of a front wheel-side vehicle body 6 and a rear wheel output unit 60 which adjusts the height of a rear wheel-side vehicle body 6.

The output unit 10 and the input unit 100 are connected through a connection pipe 5, and, by the operation of the input unit 100, the working fluid 4 flows from the input unit 100 to the output unit 10 or from the output unit 10 to the input unit 100. The output unit 10 includes the front wheel output unit 20 which is installed on the front wheel of the vehicle body 6 and the rear wheel output unit 60 which is installed on the rear wheel of the vehicle body 6 (refer to FIG. 35).

The input unit 100 linearly moves an input piston part 113 by using the rotational power of a driving part 101 to control the flow of the working fluid 4 from the output unit 10 to the input unit 100, or from the working fluid 4 to the output unit 10.

As illustrated in FIGS. 4 and 5, as a piston part 27 is moved upward by the working fluid 4 introduced into an inner space 45 of the front wheel output unit 20, the height of the vehicle body 6 is increased by a damper rod part 22 which is moved upward together with the piston part 27. A lower portion of the front wheel output unit 20 is connected to a wheel support 8 which rotatably supports a wheel 7, and an upper portion of the front wheel output unit 20 supports the vehicle body 6.

As illustrated in FIGS. 3 and 6, as the working fluid 4 flows from the front wheel output unit 20 toward the input unit 100, the piston part 27 is moved downward. Therefore, the height of the vehicle body 6 is reduced by the damper rod part 22 which is moved downward together with the piston part 27.

Figure 7:
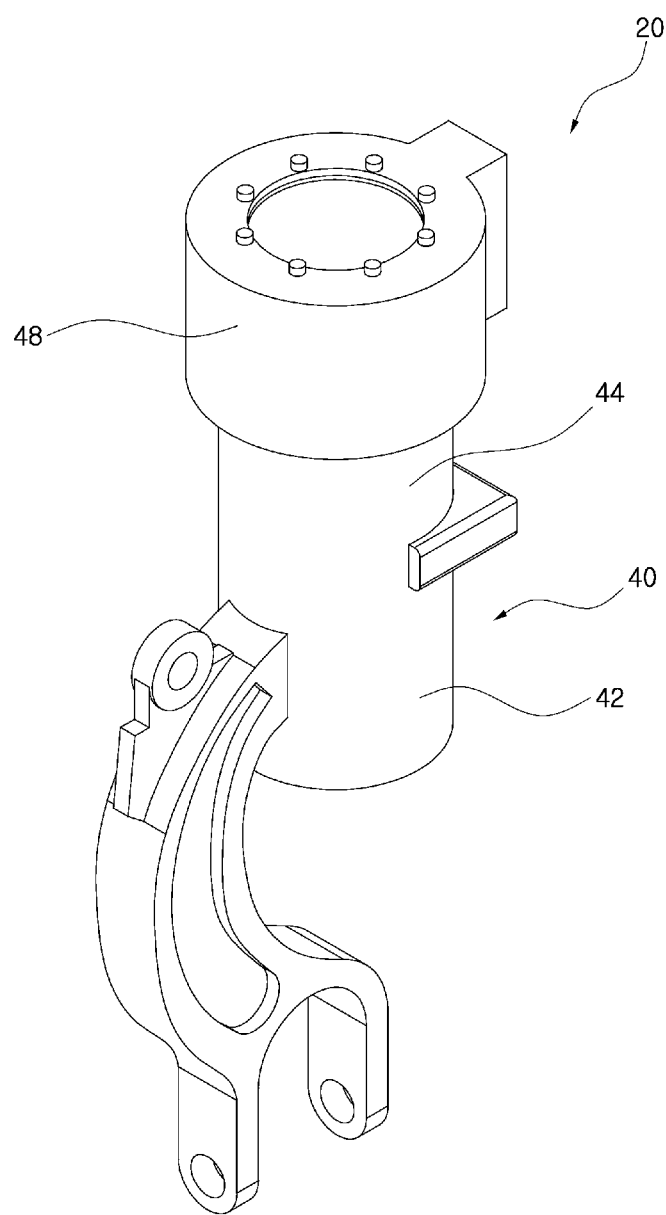
FIG. 7 is a perspective view illustrating a front wheel output unit in accordance with the exemplary embodiment of the disclosure.
Figure 8:
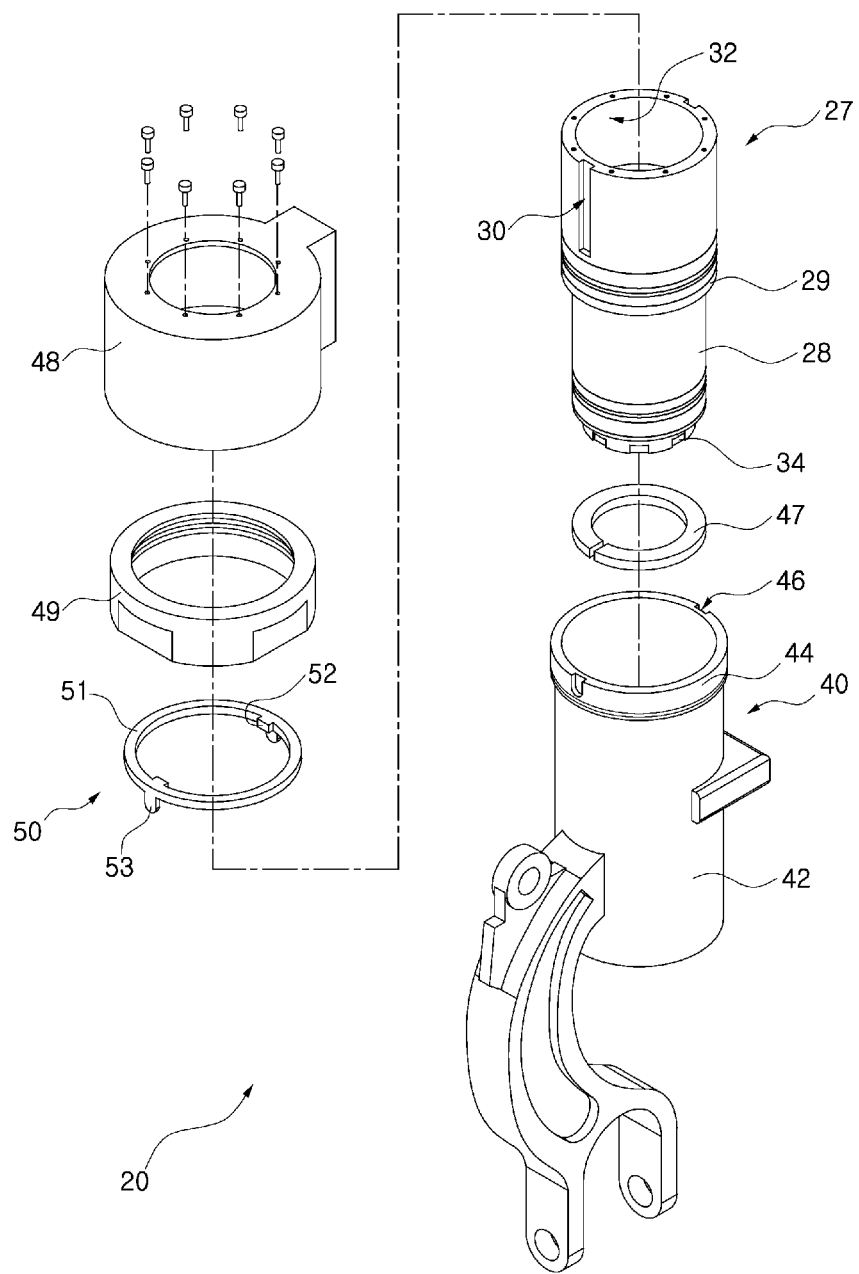
FIG. 8 is an exploded perspective view of the front wheel output unit in accordance with the exemplary embodiment of the disclosure.
Figure 9:
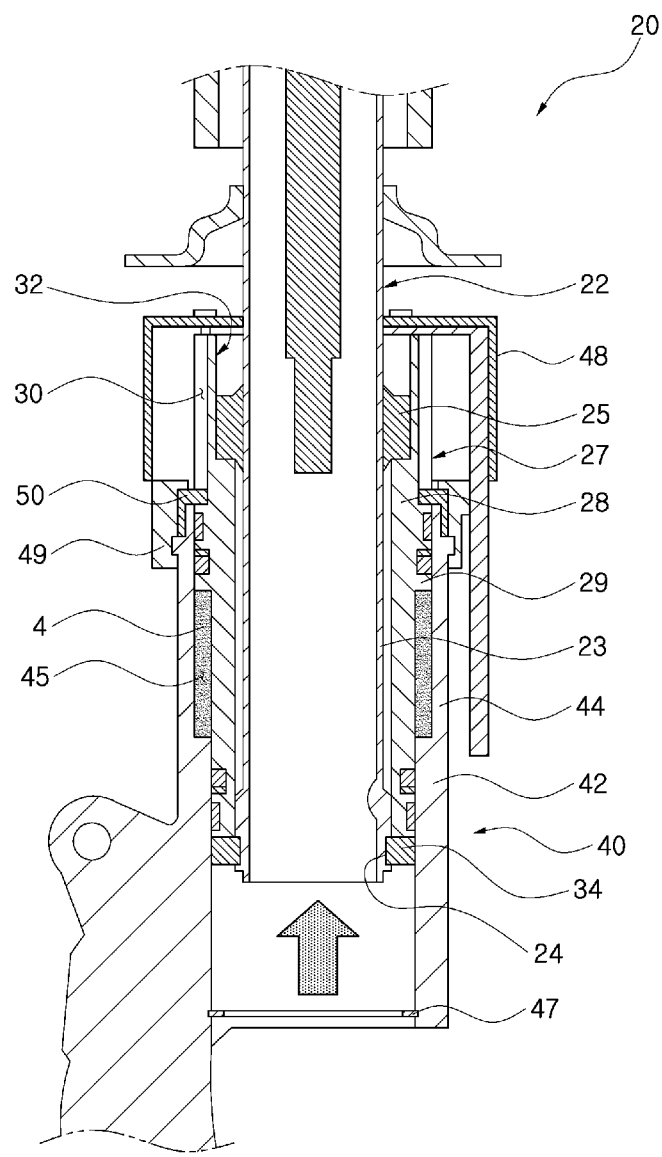
FIG. 9 is a cross-sectional view illustrating a process of raising a damper rod part in accordance with the exemplary embodiment of the disclosure.
Figure 10:
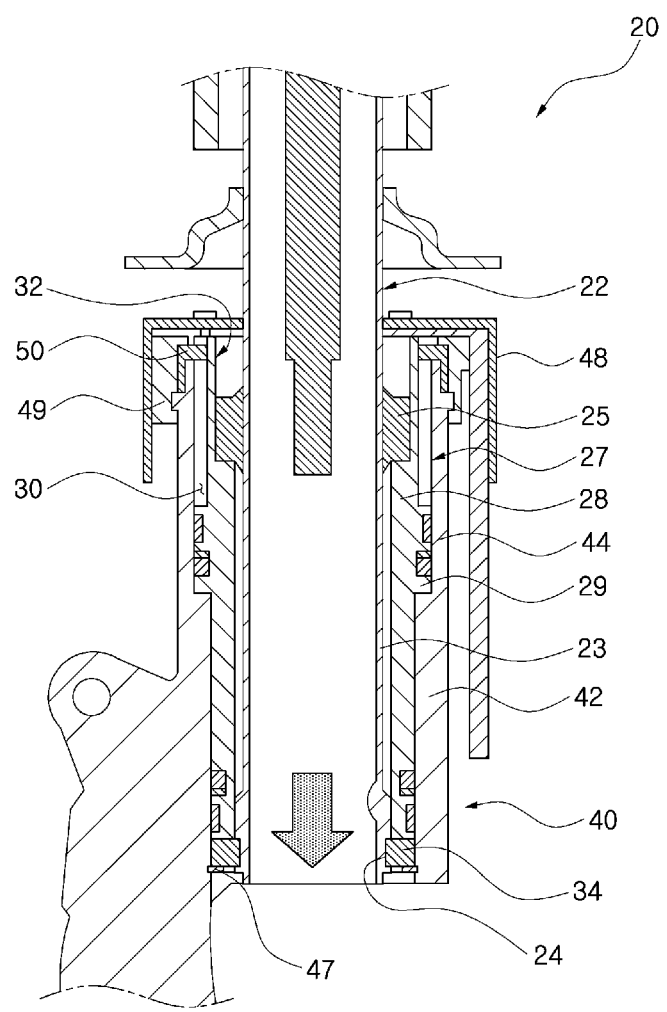
FIG. 10 is a cross-sectional view illustrating a process of lowering the damper rod part in accordance with the exemplary embodiment of the disclosure.
Figure 11:
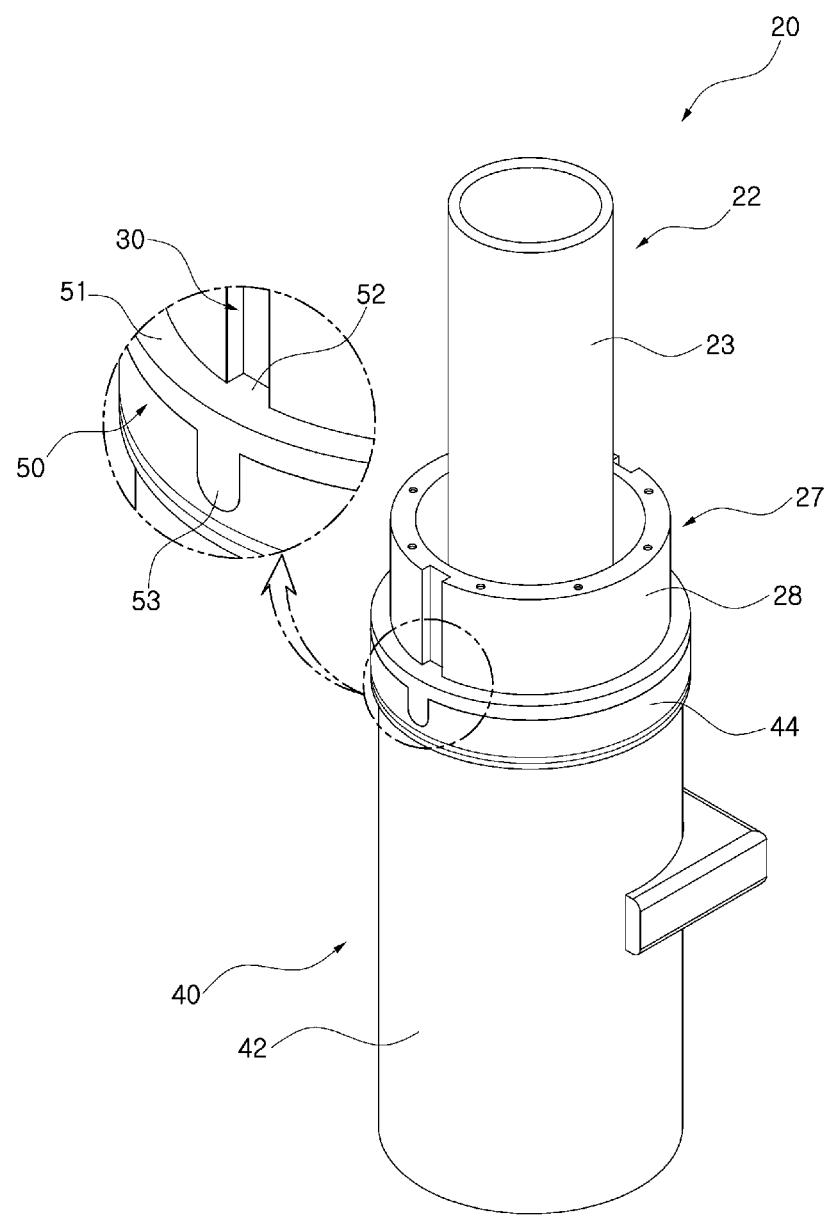
FIG. 11 is a perspective view illustrating a rotation suppressing bracket in accordance with the exemplary embodiment of the disclosure.
Figure 12:
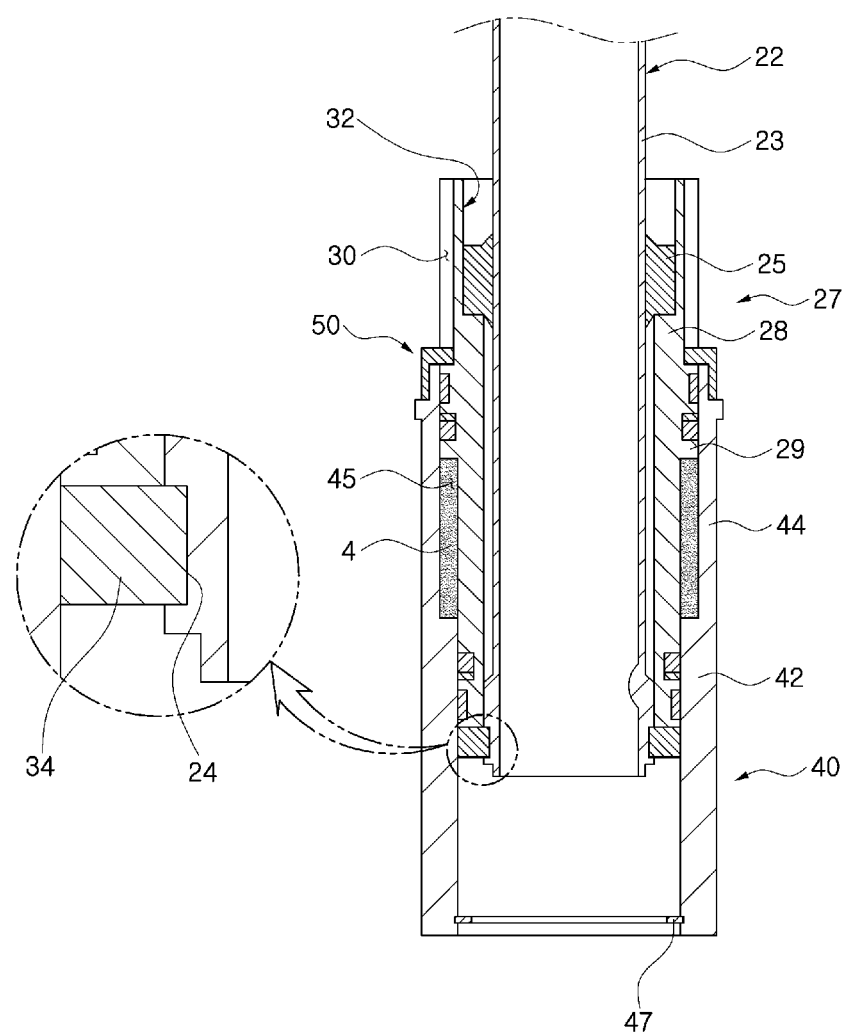
FIG. 12 is a cross-sectional view illustrating a process of locking a fastening nut to a nut coupling part of the damper rod part in accordance with the exemplary embodiment of the disclosure.
Figure 13:
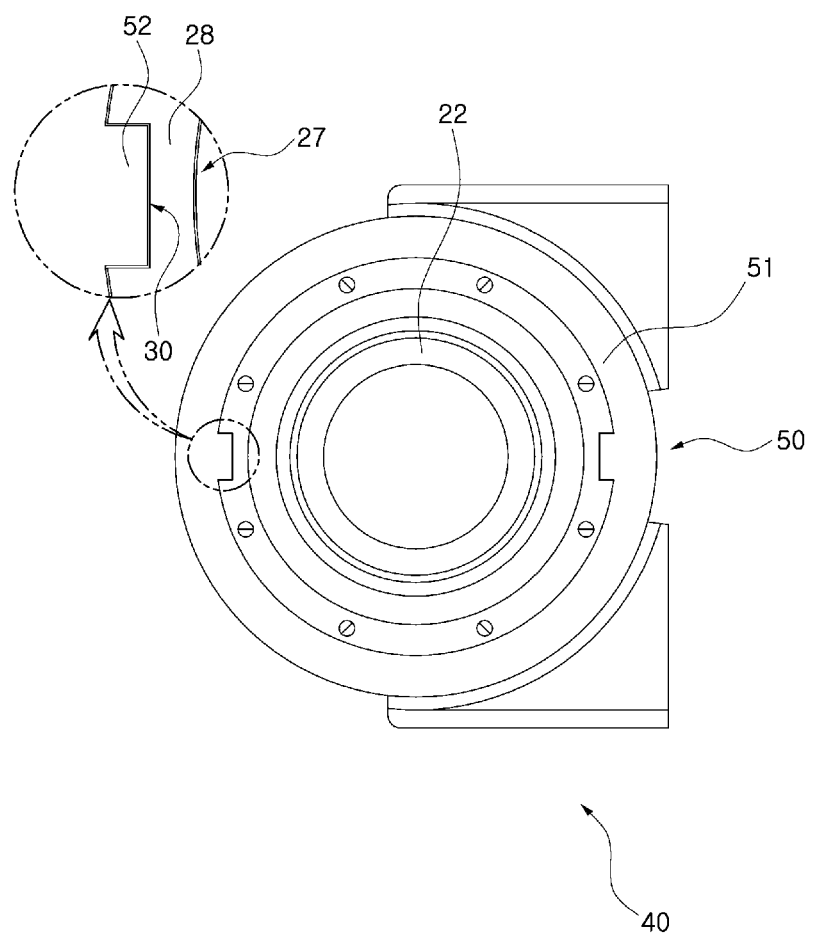
FIG. 13 is a plan view illustrating a process of inserting a first engagement protrusion of the rotation suppressing bracket into a side engagement groove part in accordance with the exemplary embodiment of the disclosure.
Figure 14:
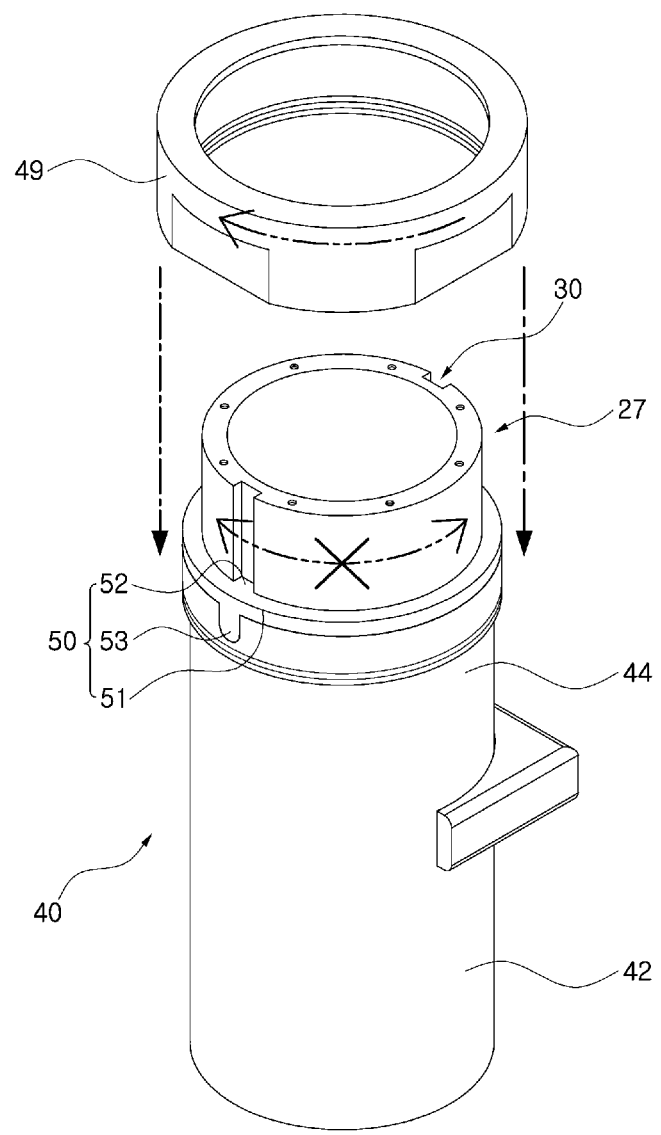
FIG. 14 is a perspective view illustrating a process of disassembling an output cover from a cylinder housing part in accordance with the exemplary embodiment of the disclosure.

FIG. 7 is a perspective view illustrating the front wheel output unit in accordance with the exemplary embodiment of the disclosure, FIG. 8 is an exploded perspective view of the front wheel output unit in accordance with the exemplary embodiment of the disclosure, FIG. 9 is a cross-sectional view illustrating a process of raising the damper rod part in accordance with the exemplary embodiment of the disclosure, FIG. 10 is a cross-sectional view illustrating a process of lowering the damper rod part in accordance with the exemplary embodiment of the disclosure, FIG. 11 is a perspective view illustrating the rotation suppressing bracket 50 in accordance with the exemplary embodiment of the disclosure, FIG. 12 is a cross-sectional view illustrating a process of locking a fastening nut 34 to a nut coupling part 24 of the damper rod part 22 in accordance with the exemplary embodiment of the disclosure, FIG. 13 is a plan view illustrating a process of inserting a first engagement protrusion 52 of the rotation suppressing bracket 50 into a side engagement groove part 30 in accordance with the exemplary embodiment of the disclosure, and FIG. 14 is a perspective view illustrating a process of disassembling an output cover 49 from a cylinder housing part 40 in accordance with the exemplary embodiment of the disclosure.

As illustrated in FIGS. 1 and 7, 8, 9, 10, 11, 12, 13, and 14, the front wheel output unit 20 may have various shapes without departing from a technical idea that the front wheel output unit 20 is installed on the front wheel of the vehicle body 6, is connected with the input unit 100, is supplied with the working fluid 4 and thereby is changed in its length. The front wheel output unit 20 in accordance with the exemplary embodiment includes a first elastic part 21, the damper rod part 22, a protrusion part 25, the piston part 27, a guide part 32, a fastening nut 34, a cylinder housing part 40, a stopper 47, a dust cover 48, an output cover 49, and a rotation suppressing bracket 50.

The damper rod part 22 which extends in a vertical direction along the lengthwise direction of the front wheel output unit 20 is connected to a damper for damping vibration. The first elastic part 21 which damps vibration by using a spring is installed around the damper rod part 22. The lower end of the first elastic part 21 is supported by a seat member which is fastened to the outer surface of the damper rod part 22.

The damper rod part 22 may have various shapes without departing from a technical idea that the lower portion of the damper rod part 22 is positioned in the piston part 27 and the upper portion of the damper rod part 22 extends upward out of the piston part 27. The damper rod part 22 in accordance with the exemplary embodiment includes a damper rod body 23 which extends into a piston body 28 and is connected to the protrusion part 25, and a nut coupling part 24 which forms a thread on the outer surface of the damper rod body 23. The damper rod body 23 has a circular rod shape, and the nut coupling part 24 is positioned adjacent to the lower end of the damper rod body 23.

The protrusion part 25 may have various shapes without departing from a technical idea that the protrusion part 25 forms the shape of a projection protruding outward from the damper rod part 22. The protrusion part 25 in accordance with the exemplary embodiment is formed integrally with the damper rod part 22, or is fastened to the damper rod part 22 by being fabricated as a separate member. The protrusion part 25 is inserted into the guide part 32 to be prevented or reduced from being rotated.

The protrusion part 25 in accordance with the exemplary embodiment projects on both sides of the damper rod body 23, and is inserted into the guide part 32 which is formed in the piston part 27, to be prevented or reduced from being rotated.

The piston part 27 may have various shapes without departing from a technical idea that the piston part 27 is positioned in the cylinder housing part 40, is linearly moved by the working fluid 4 and is formed with grooves on the outer surface thereof in a moving direction thereof. The piston part 27 in accordance with the exemplary embodiment includes the piston body 28, a side engagement part 29, and a side engagement groove part 30.

The piston body 28 has a cylindrical shape which surrounds the outer surface of the damper rod part 22, and extends in the vertical direction. The piston body 28 is positioned in the cylinder housing part 40, and is installed to be linearly movable along the cylinder housing part 40.

The side engagement part 29 projects outward from the piston body 28, and is installed at a position that faces the end of a first body part 42 of the cylinder housing part 40. Since the side engagement part 29 which projects outward from the piston body 28 in a ring shape forms a plurality of projections, a plurality of seals and backup rings are installed on the side engagement part 29. The side engagement part 29 forms band-shaped projections along the outer surface of the piston body 28, and is installed in a horizontal direction.

When observed at the position of the side engagement part 29, the lower portion of the piston body 28 is formed to have an outer diameter smaller than an outer diameter of the upper portion of the piston body 28. The guide part 32 is formed on the inner surface of the upper portion of the piston body 28 such that the protrusion part 25 is inserted into and engaged in the guide part 32.

The upper portion of the piston body 28 includes the side engagement groove part 30 on the side surface of the piston body 28 along the moving direction of the piston body 28. The side engagement groove part 30 forms the grooves which extend in the vertical direction.

The guide part 32 may have various shapes without departing from a technical idea that the protrusion part 25 is inserted into the guide part 32 formed in the piston part 27 facing the protrusion part 25. The guide part 32 in accordance with the exemplary embodiment may have a recessed shape inside the piston body 28 facing the protrusion part 25.

The protrusion part 25 and the guide part 32 may be applied to various suspension types, and may prevent or reduce unnecessary rotation upon installation of the device 1 for adjusting a height of a vehicle. Therefore, the durability of the parts of the front wheel output unit 20 may be improved. The technology of preventing or reducing the rotation of the damper rod part 22 by using the protrusion part 25 and the guide part 32 may be applied to a front wheel multi-link or double wishbone type.

The damper rod part 22 has a thread shape as the nut coupling part 24 adjacent to the lower end thereof, and has the protrusion part 25 at the middle portion thereof. The protrusion part 25 may be directly formed on the damper rod part 22, or may be formed separately from the damper rod part 22 and be assembled to the damper rod part 22 through a method such as welding.

The protrusion part 25 is inserted into the guide part 32 to be prevented or reduced from being rotated, and, as a method for coupling the protrusion part 25 and the piston part 27, various methods such as key coupling and spline coupling may be used. The nut coupling part 24 which is formed adjacent to the lower end of the damper rod part 22 projects out of the lower end of the piston part 27 and is then coupled with the fastening nut 34. Since the upper surface of the fastening nut 34 is brought into contact with the lower end of the piston part 27, the damper rod part 22 and the piston part 27 are moved together upward and downward. The fastening nut 34 is locked to the nut coupling part 24, and supports the piston body 28.

In the operation of the device 1 for adjusting a height of a vehicle, since the rotation of the damper rod part 22 is prevented or reduced and the upward and downward movement thereof is permitted, the durability of parts brought into contact with the damper rod part 22 may be improved. Further, since the unnecessary behavior of the vehicle body 6 is prevented, vehicle stability may be improved.

The cylinder housing part 40 may have various shapes without departing from a technical idea that the cylinder housing part 40 has an inner space which is supplied with the working fluid 4. The cylinder housing part 40 in accordance with the exemplary embodiment includes the first body part 42 and a second body part 44.

The first body part 42 may have various shapes without departing from a technical idea that first body part 42 is positioned outside or surround the piston part 27 and has a working space that guides the upward and downward movement of the piston part 27. The first body part 42 in accordance with the exemplary embodiment has a cylindrical shape which is extends in the vertical direction, and the snap ring-shaped stopper 47 is coupled to the lower end of the first body part 42. Since the snap ring is installed at the lower end to face the fastening nut 34, when the fastening nut 34 is moved downward together with the damper rod part 22, the fastening nut 34 is engaged with the stopper 47 and the stopper 47 stops the fastening nut 34 from being released downward.

The second body part 44 extends upward from the first body part 42 while forming a step portion with the first body part 42, and have a shape corresponding to the side surface of the piston part 27. The outer diameters of the first body part 42 and the second body part 44 are the same, but the inner diameter of the first body part 42 is smaller than the inner diameter of the second body part 44. Thus, the upper end of the first body part 42 which is connected with the second body part 44 forms a step portion, and forms the inner space 45 which is supplied with the working fluid 4. The inner space 45 which is supplied with the working fluid 4 is formed between the side engagement part 29 and the end of the first body part 42 and between the second body part 44 and the piston body 28.

Since the working fluid 4 supplied into the inner space 45 pushes upward the side engagement part 29, the damper rod part 22 is moved upward together with the piston part 27. The distance between the inner surface of the first body part 42 and the inner surface of the second body part 44 corresponds to a height by which the side engagement part 29 projects outward from the piston body 28.

The dust cover 48 covers the upper end of the piston part 27, and prevents or reduces foreign substances from being introduced into the piston part 27. The dust cover 48 is fastened to the upper end of the piston part 27 and is moved upward and downward together with the piston part 27. The dust cover 48 is installed to have a shape which covers the open upper end of the piston part 27.

The rotation suppressing bracket 50 may have various shapes without departing from a technical idea that the rotation suppressing bracket 50 is coupled to the cylinder housing part 40 and is connected to the side surface of the piston part 27 to prevent or reduce the rotation of the piston part 27. The rotation suppressing bracket 50 in accordance with the exemplary embodiment has a projection inserted into the side engagement groove part 30 formed on the side surface of the piston part 27, and includes a bracket body 51, a first engagement protrusion 52 and a second engagement protrusion 53.

As the projection of the rotation suppressing bracket 50 is inserted into the side engagement groove part 30 which is formed in the piston part 27, the rotation of the piston part 27 may be prevented or reduced. Alternatively, a projection may be formed on the piston part 27 and a groove part may be formed in the rotation suppressing bracket 50 facing the piston part 27, to prevent or reduce the rotation of the piston part 27.

The piston part 27 and the rotation suppressing bracket 50 are prevented or reduced from being rotated by a connection structure of groove and projection shapes. A groove or a projection for preventing or reducing the rotation of the piston part 27 may be formed in not the rotation suppressing bracket 50 but other parts which face the piston part 27.

The bracket body 51 has the shape of a ring which is brought into contact with the end of the cylinder housing part 40, and is stacked on the upper end of the cylinder housing part 40.

The first engagement protrusion 52 may have various shapes without departing from a technical idea that the first engagement protrusion 52 extends from the bracket body 51 and is inserted into the side engagement groove part 30. The first engagement protrusion 52 in accordance with the exemplary embodiment is provided in a plural number in the bracket body 51, and extends in the horizontal direction. The first engagement protrusion 52 projects inward of the bracket body 51 and is inserted into the side engagement groove part 30 which is formed in the piston part 27, thereby preventing or reducing the rotation of the piston part 27.

The second engagement protrusion 53 may have various shapes without departing from a technical idea that the second engagement protrusion 53 extends from the bracket body 51 and is inserted into and engaged in a fastening groove part 46 which is formed on the end of the cylinder housing part 40. The second engagement protrusion 53 in accordance with the exemplary embodiment is provided in a plural number in the bracket body 51, extends downward and is inserted into the fastening groove part 46, thereby preventing or reducing the rotation of the bracket body 51.

The rotation of the piston part 27 is prevented or reduced by the rotation suppressing bracket 50, and the rotation of the damper rod part 22 is prevented or reduced as the protrusion part 25 is inserted into the guide part 32 which is formed inside the piston part 27. Therefore, regardless of a suspension type, unnecessary rotation may be prevented or reduced when the device 1 for adjusting a height of a vehicle is applied.

Thus, a separate additional device such as a sensor may be easily installed, and the durability of the parts of the front wheel output unit 20 may be improved.

The output cover 49 for fastening the rotation suppressing bracket 50 is fastened to the cylinder housing part 40 while surrounding the rotation suppressing bracket 50. The output cover 49 is locked to the upper end of the cylinder housing part 40 while surrounding the rotation suppressing bracket 50.

Figure 35:
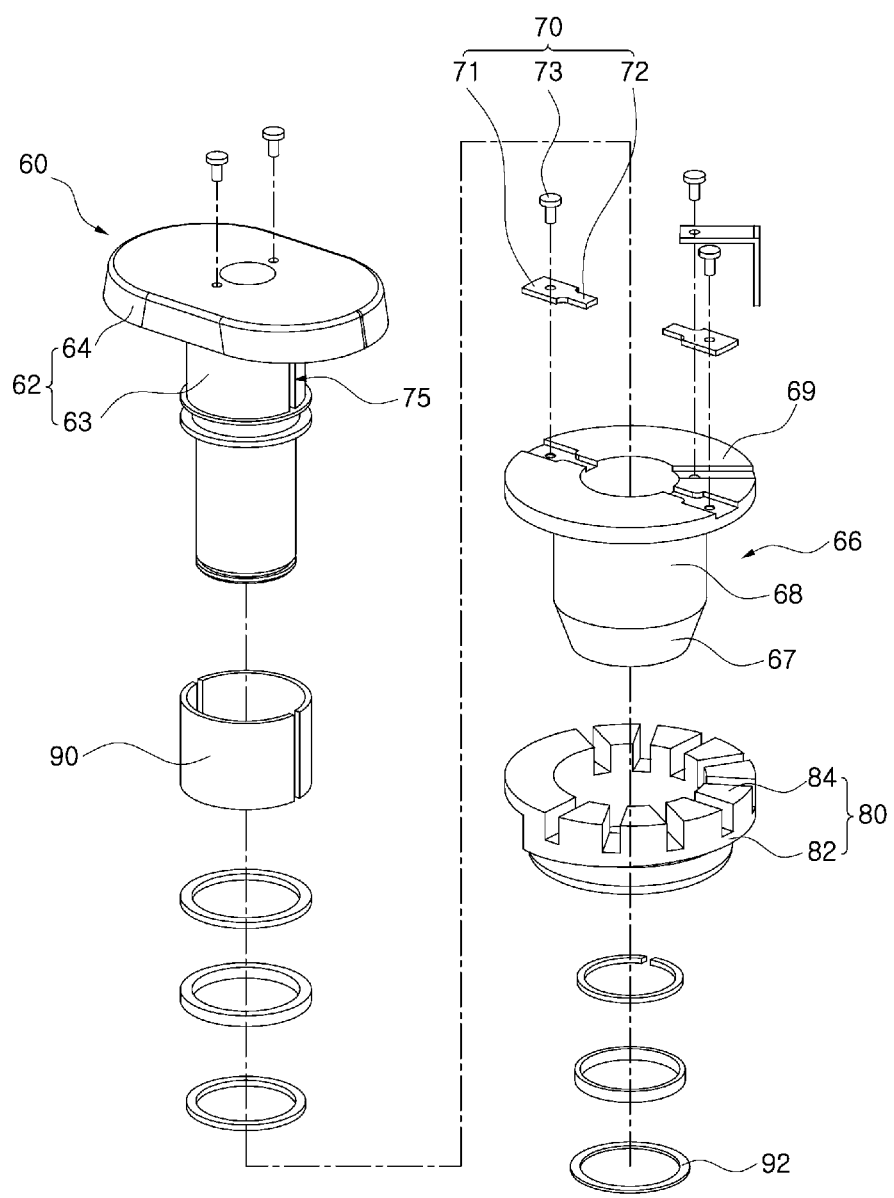
FIG. 35 is an exploded perspective view of a rear wheel output unit in accordance with the exemplary embodiment of the disclosure.
Figure 36:
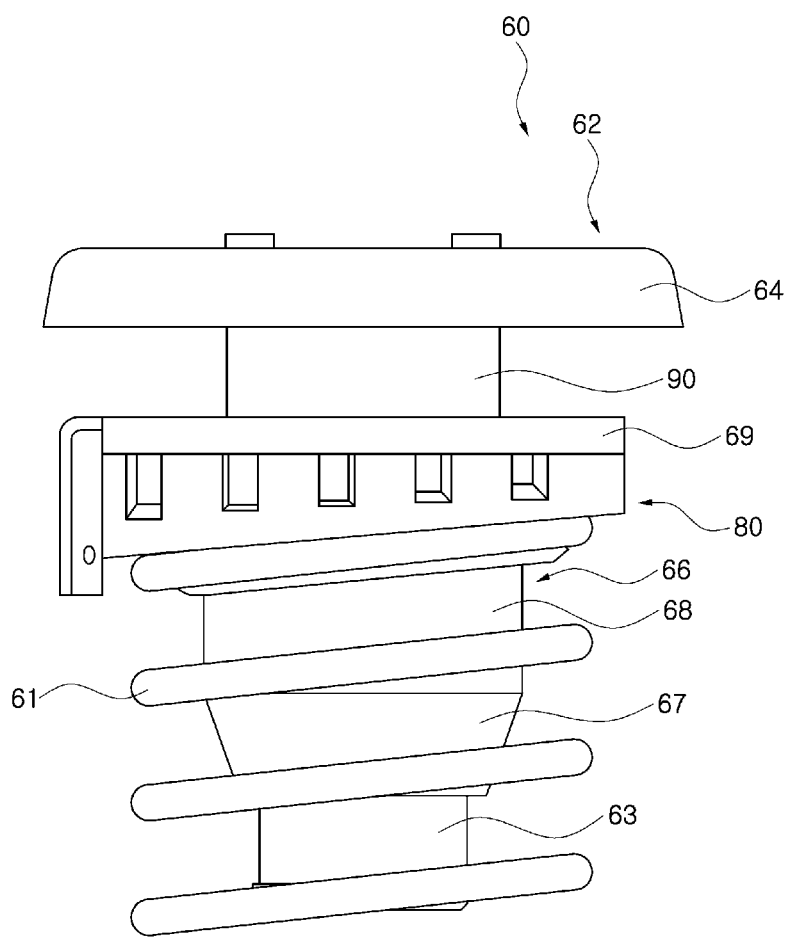
FIG. 36 is a front view of the rear wheel output unit in accordance with the exemplary embodiment of the disclosure.
Figure 37:
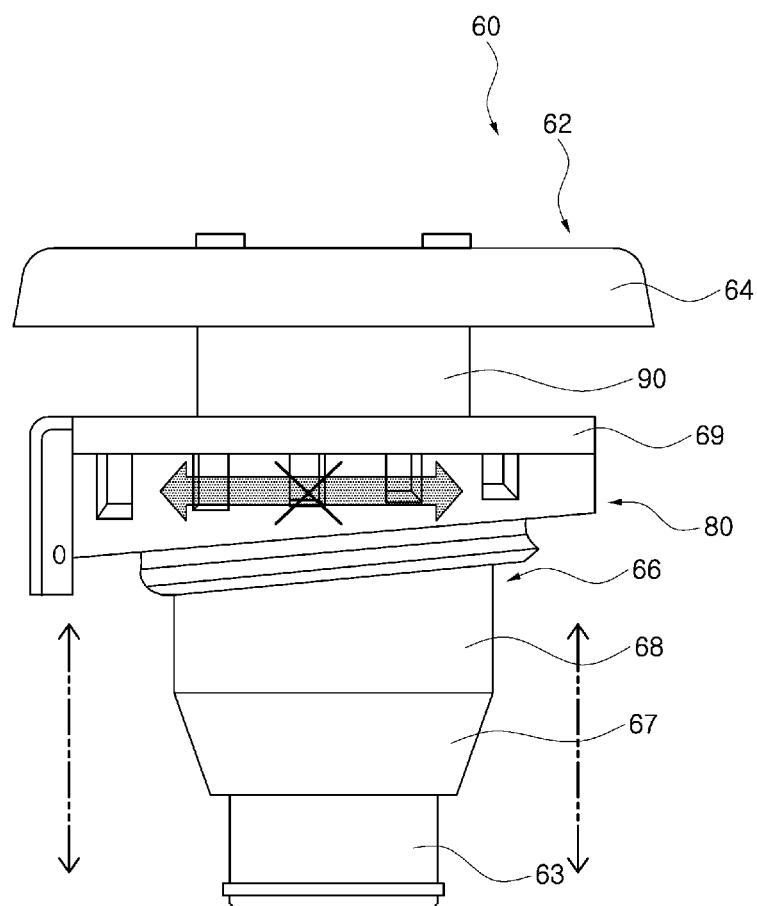
FIG. 37 is a front view illustrating the rotation of a vehicle piston part being prevented or reduced, in accordance with the exemplary embodiment of the disclosure.
Figure 38:
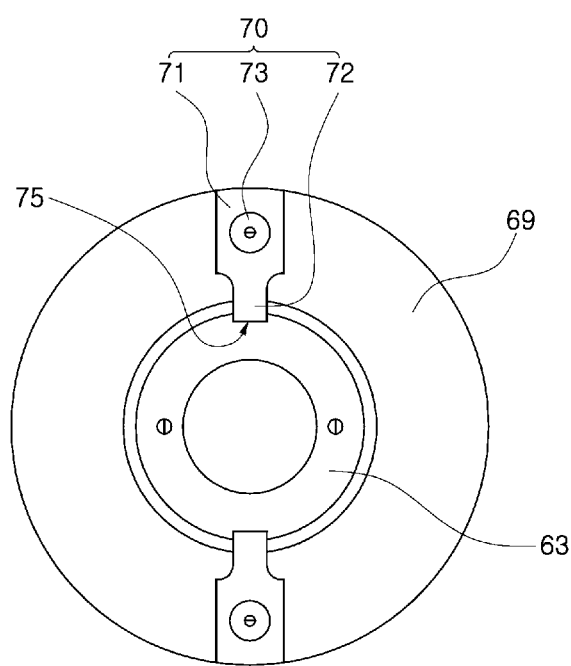
FIG. 38 is a plan view illustrating a rotation suppressing part in accordance with the exemplary embodiment of the disclosure.
Figure 39:
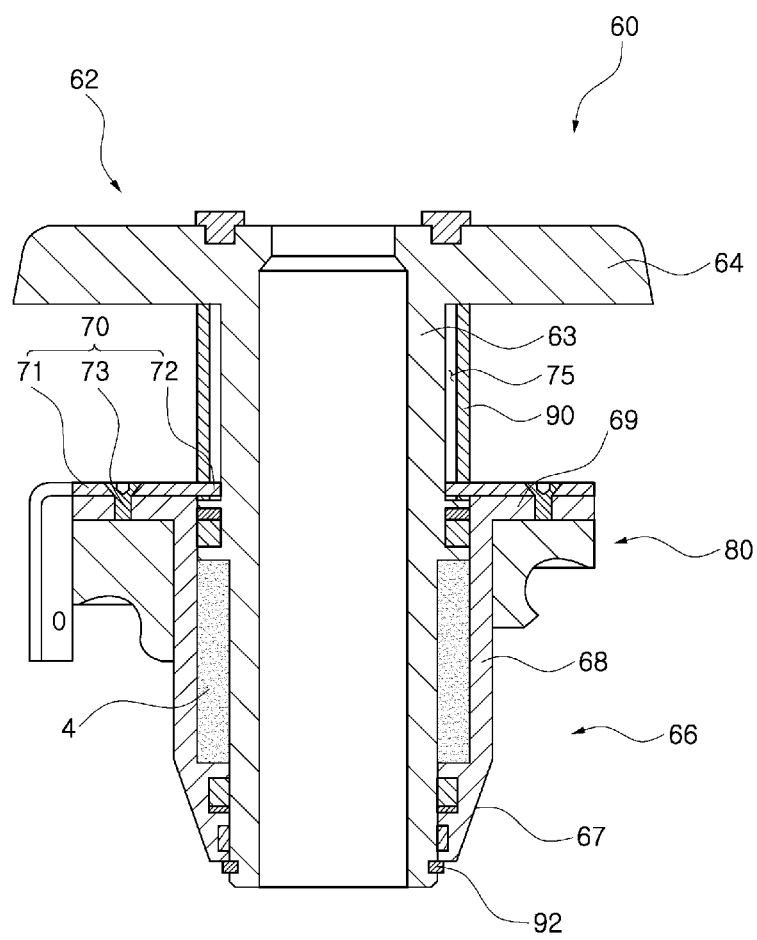
FIG. 39 is a cross-sectional view illustrating the length of the rear wheel output unit increased in accordance with the exemplary embodiment of the disclosure.
Figure 40:
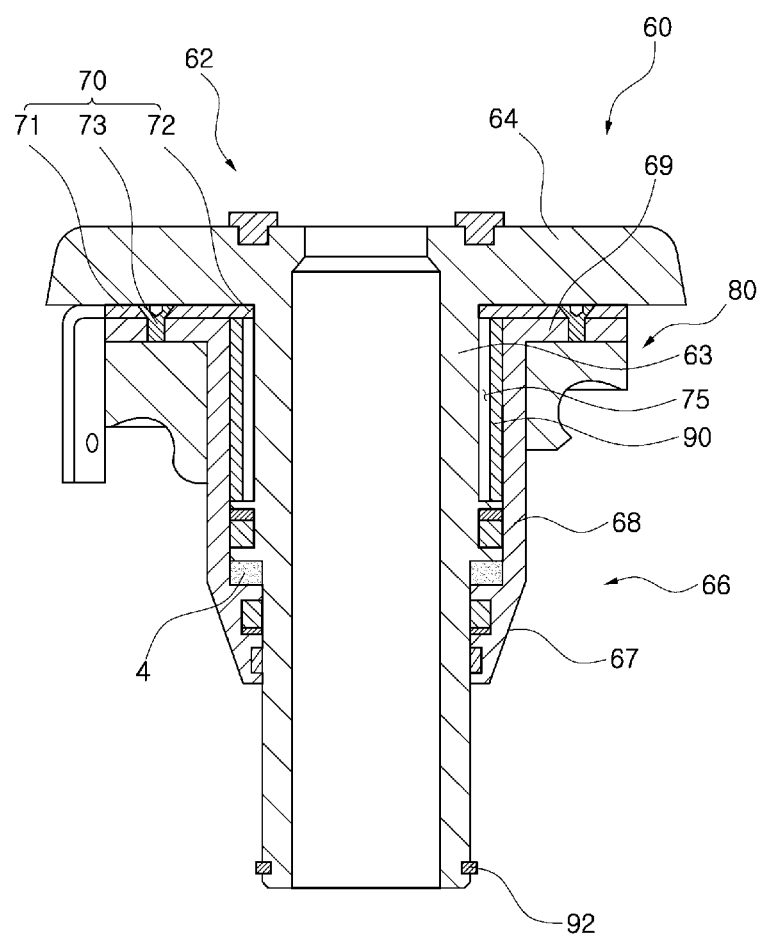
FIG. 40 is a cross-sectional view illustrating the length of the rear wheel output unit reduced in accordance with the exemplary embodiment of the disclosure.

FIG. 35 is an exploded perspective view of the rear wheel output unit 60 in accordance with the exemplary embodiment of the disclosure, FIG. 36 is a front view of the rear wheel output unit 60 in accordance with the exemplary embodiment of the disclosure, FIG. 37 is a front view illustrating the rotation of a vehicle piston part 62 being prevented or reduced, in accordance with the exemplary embodiment of the disclosure, FIG. 38 is a plan view illustrating a rotation suppressing or reducing part in accordance with the exemplary embodiment of the disclosure, FIG. 39 is a cross-sectional view illustrating the length of the rear wheel output unit 60 increased in accordance with the exemplary embodiment of the disclosure, and FIG. 40 is a cross-sectional view illustrating the length of the rear wheel output unit 60 reduced in accordance with the exemplary embodiment of the disclosure.

As illustrated in FIGS. 35, 36, 37, 38, 39, and 40, the rear wheel output unit 60 may have various shapes without departing from a technical idea that the rear wheel output unit 60 is connected to the vehicle body 6 to reduce vibration and the length of the rear wheel output unit 60 is changed due to transfer of the working fluid 4 to adjust the height of the vehicle body 6. The rear wheel output unit 60 in accordance with the exemplary embodiment includes a vehicle piston part 62, a vehicle cylinder part 66, a rotation suppressing part 70, a rotation suppressing guide part 75, a rear wheel elastic support part 80, a piston guide 90, and a rear wheel stopper 92.

The rear wheel output unit 60 may be applied to not only the rear wheel of the vehicle body 6 but also a multi-link or a MacPherson strut.

The vehicle piston part 62 may have various shapes without departing from a technical idea that the vehicle piston part 62 is provided on the rear wheel of a vehicle, is positioned in the vehicle cylinder part 66 and is linearly moved by the working fluid 4. The vehicle piston part 62 in accordance with the exemplary embodiment has a T shape, and is moved upward and downward in the vehicle cylinder part 66.

The vehicle piston part 62 includes a rear wheel piston body 63 which is positioned in the vehicle cylinder part 66 and is provided to be linearly movable along the vehicle cylinder part 66, and an outer engagement part 64 which projects outward from the rear wheel piston body 63 and faces the end of a second cylinder body 68.

The rear wheel piston body 63 has the shape of a rod which extends in the vertical direction, and has a projection for assembling an airtight seal, on an outer surface thereof. The outer engagement part 64 has the shape of a plate which extends in the horizontal direction on the upper end of the rear wheel piston body 63, and is positioned over the vehicle cylinder part 66.

The rotation suppressing part 70 is inserted into the rotation suppressing guide part 75 formed on a side surface of the vehicle piston part 62 facing the rotation suppressing part 70. The rotation suppressing guide part 75 may have a groove shape which extends in the vertical direction.

The vehicle cylinder part 66 has an inner space which is supplied with the working fluid 4, and is formed with a passage which guides the upward and downward movement of the rear wheel piston body 63, in the vertical direction. The vehicle cylinder part 66 in accordance with the exemplary embodiment includes a first cylinder body 67, the second cylinder body 68, and a body support member 69.

The first cylinder body 67 is positioned outside or surrounding the vehicle piston part 62, and guides the upward and downward movement of the vehicle piston part 62. The second cylinder body 68 extends from the first cylinder body 67 while forming a step portion with the first cylinder body 67, and may have a shape which faces the side surface of the vehicle piston part 62.

The second cylinder body 68 extends upward from the first cylinder body 67, and a space into which the working fluid 4 is supplied is defined in the second cylinder body 68.

The body support member 69 extends in the horizontal direction at the upper end of the second cylinder body 68, and is coupled with the rotation suppressing part 70. The outer engagement part 64 is positioned on the body support member 69. When the vehicle piston part 62 is lowered, as the outer engagement part 64 is brought into contact with the body support member 69, the further downward movement of the vehicle piston part 62 is prevented or reduced.

An inner space which is supplied with the working fluid 4 is defined between the projection which projects outward from the side surface of the rear wheel piston body 63 and the end of the first cylinder body 67. Also, an inner space 45 which is supplied with the working fluid 4 is defined between the rear wheel piston body 63 and the second cylinder body 68. Since a process in which the vehicle piston part 62 is moved upward and downward by the supply of the working fluid 4 is similar to the operation of the front wheel output unit 20, detailed description thereof will be omitted herein.

The rotation suppressing part 70 may have various shapes without departing from a technical idea that the rotation suppressing part 70 is fastened to the vehicle cylinder part 66 and has a projection which projects toward the vehicle piston part 62. The rotation suppressing part 70 in accordance with the exemplary embodiment includes a rotation suppressing body 71, a rotation suppressing projection 72, and a body locking member 73.

The rotation suppressing body 71 is fastened to the body support member 69 of the vehicle cylinder part 66. The rotation suppressing projection 72 extends from the rotation suppressing body 71, is inserted into the rotation suppressing guide part 75, and prevents or reduces the rotation of the vehicle piston part 62.

The body locking member 73 has a bolt shape, passes through the rotation suppressing body 71 with the rotation suppressing body 71 brought into contact with the upper surface of the body support member 69, and is then locked to the body support member 69.

The rotation suppressing part 70 prevents or reduces the unnecessary rotation of the vehicle piston part 62 when the device 1 for adjusting a height of a vehicle is operated, regardless of a suspension type. Therefore, a task for assembling a separate additional device such as a sensor on the rear wheel output unit 60 may be easily performed. Moreover, as the rotation of the vehicle piston part 62 is prevented or reduced, the durability of an airtight seal which is provided on the vehicle piston part 62 or faces the vehicle piston part 62 may be improved. In addition, since the unnecessary behavior of the vehicle body 6 is prevented or reduced, the safety of a vehicle may be improved.

The rear wheel elastic support part 80 may have a shape which surrounds the outer surface of the vehicle cylinder part 66, and supports the upper end of a second elastic part 61. The rear wheel elastic support part 80 in accordance with the exemplary embodiment includes an elastic support body 82 which may have a shape surrounding the outer surface of the second cylinder body 68, and a plurality of protruding projections 84 which project upward from the elastic support body 82. The protruding projections 84 are assembled to contact with the lower surface of the body support member 69.

The upper end of the second elastic part 61 which uses a coil spring is seated against the elastic support body 82, and the lower end of the second elastic part 61 is connected to the vehicle body 6.

The piston guide 90 may have a shape which surrounds the outer surface of the rear wheel piston body 63, and is formed with a groove at a portion which faces the rotation suppressing guide part 75, in the vertical direction.

The rear wheel stopper 92 having a snap ring shape is provided on the rear wheel piston body 63 which projects out of the lower end of the vehicle cylinder part 66. As the rear wheel stopper 92 is engaged with the lower end of the first cylinder body 67 when the vehicle piston part 62 is moved upward above a predetermined height, the rear wheel stopper 92 prevents or reduces the release of the vehicle piston part 62.

Figure 15:
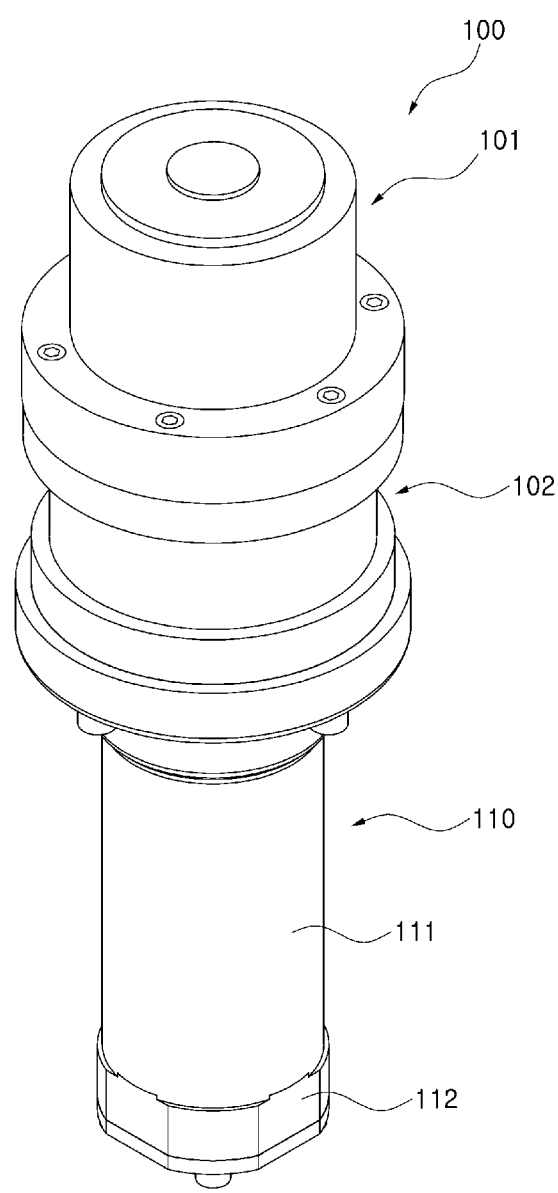
FIG. 15 is a perspective view illustrating an input unit in accordance with the exemplary embodiment of the disclosure.
Figure 16:
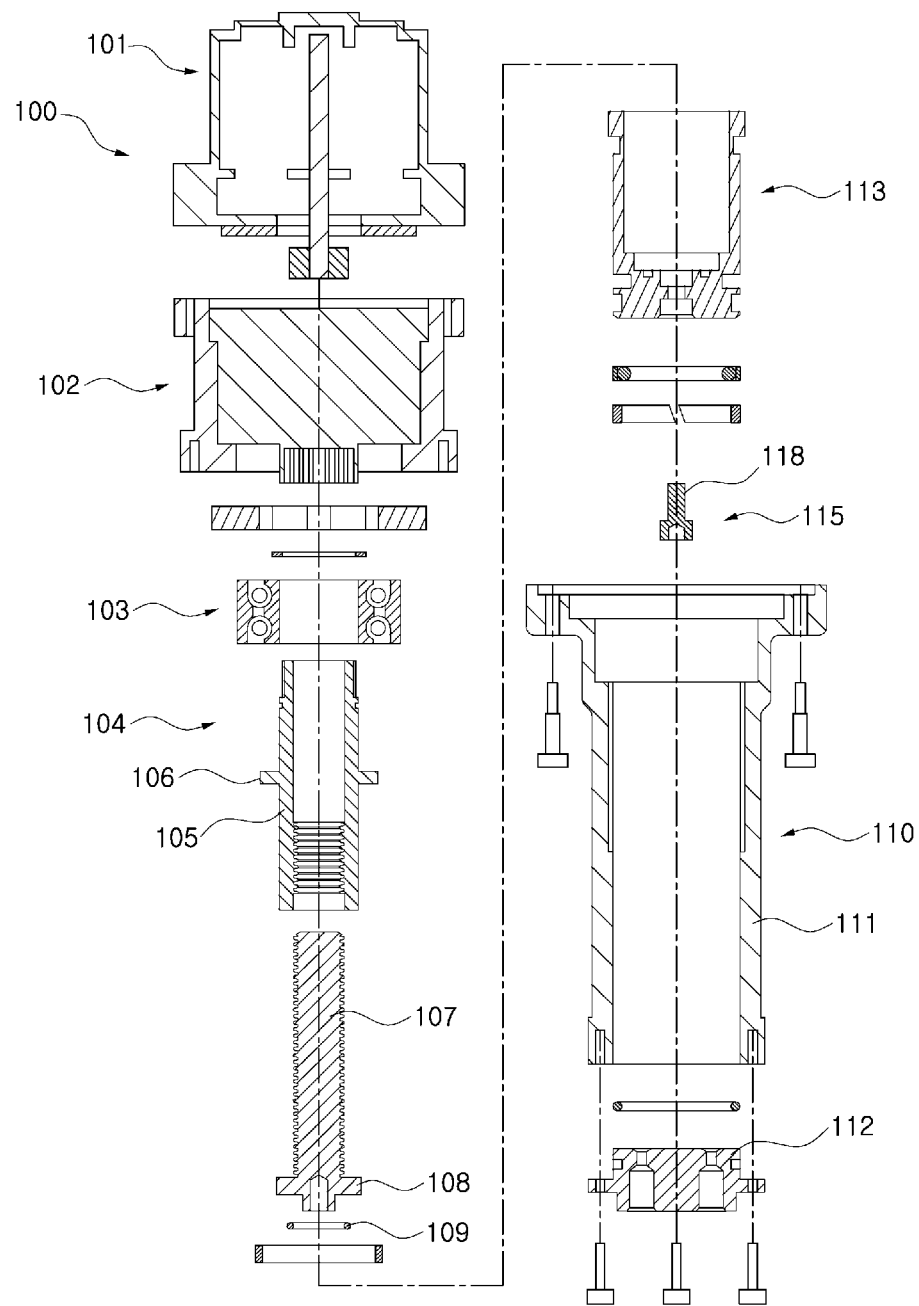
FIG. 16 is an exploded perspective view of the input unit in accordance with the exemplary embodiment of the disclosure.
Figure 17:
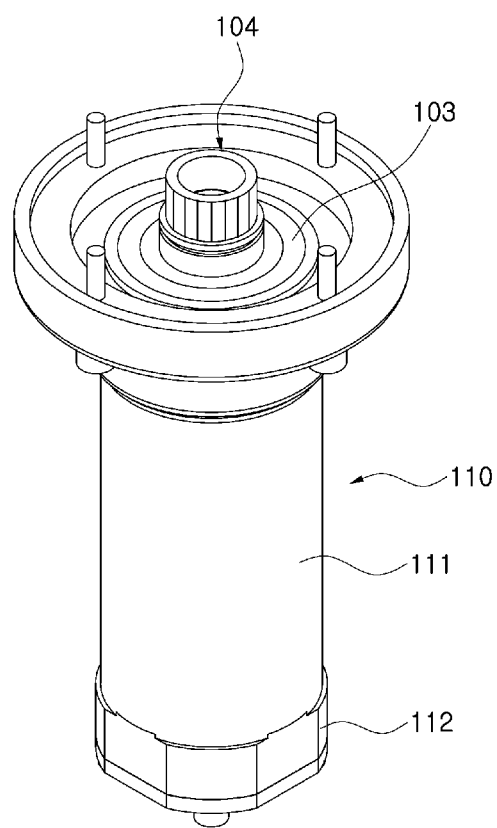
FIG. 17 is a perspective view illustrating a lead nut part assembled in an input housing part in accordance with the exemplary embodiment of the disclosure.
Figure 18:
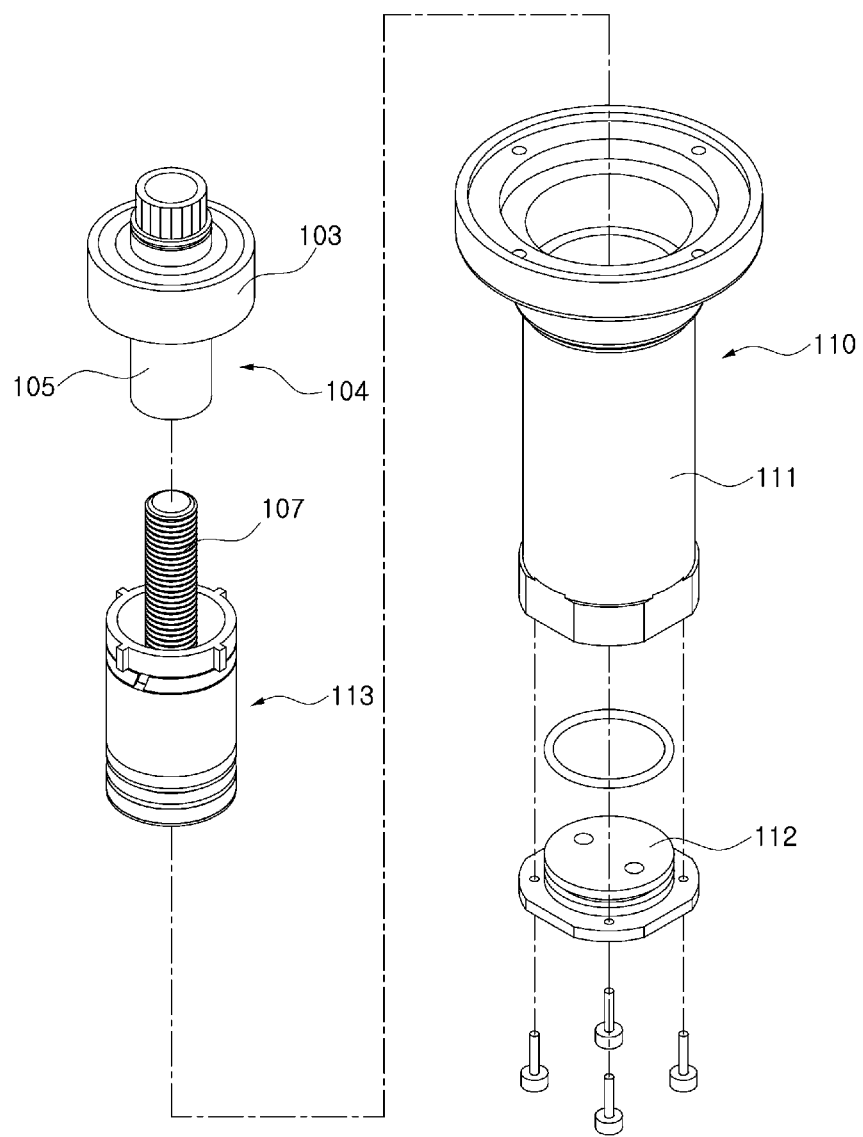
FIG. 18 is a perspective view illustrating a state in which an input piston part is disassembled from the input housing part in accordance with the exemplary embodiment of the disclosure.
Figure 19:
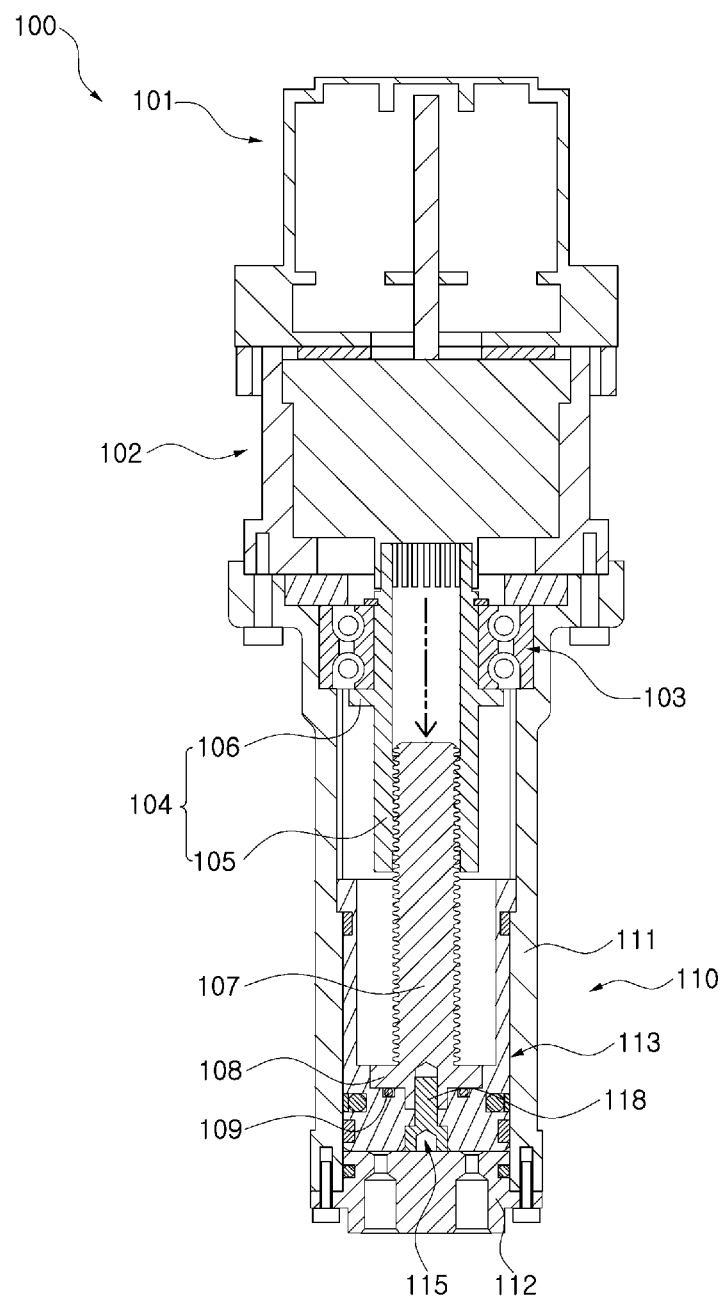
FIG. 19 is a cross-sectional view illustrating a process of lowering the input piston part in accordance with the exemplary embodiment of the disclosure.
Figure 20:
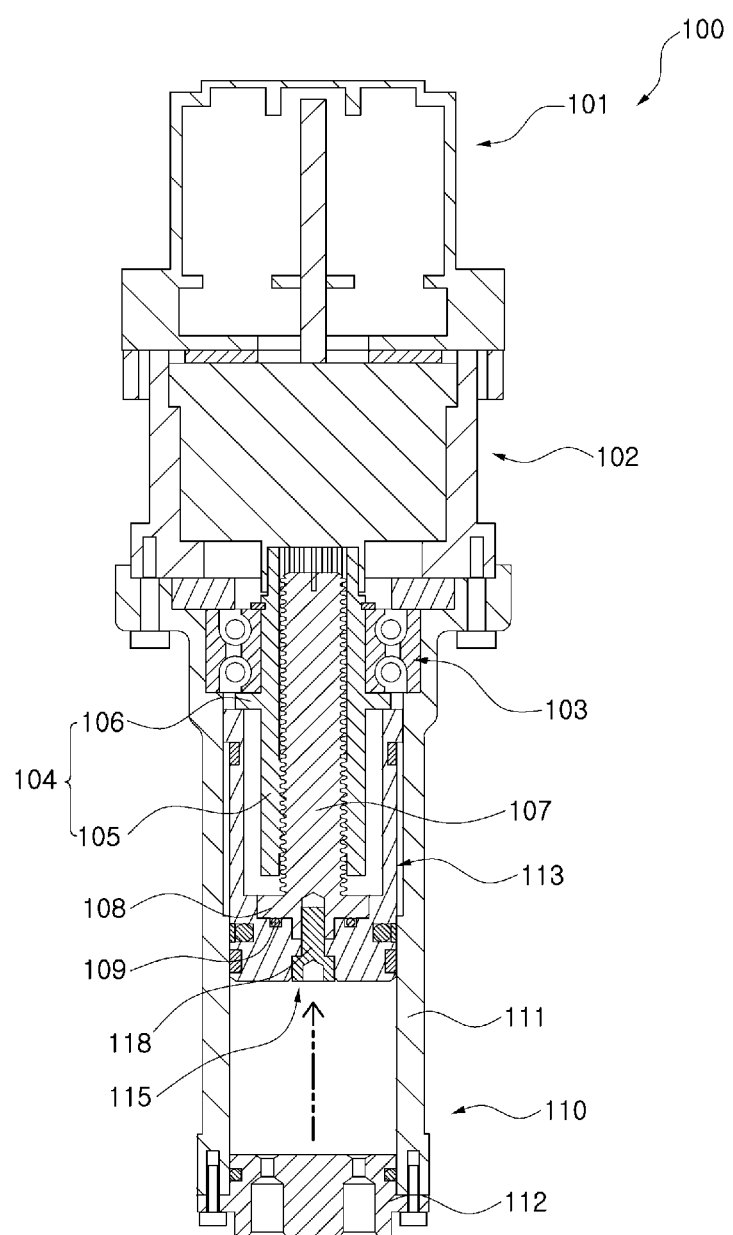
FIG. 20 is a cross-sectional view illustrating a process of raising the input piston part in accordance with the exemplary embodiment of the disclosure.

FIG. 15 is a perspective view illustrating the input unit 100 in accordance with the exemplary embodiment of the disclosure, FIG. 16 is an exploded perspective view of the input unit 100 in accordance with the exemplary embodiment of the disclosure, FIG. 17 is a perspective view illustrating a lead nut part 104 assembled in an input housing part 110 in accordance with the exemplary embodiment of the disclosure, FIG. 18 is a perspective view illustrating a state in which an input piston part 113 is disassembled from the input housing part 110 in accordance with the exemplary embodiment of the disclosure, FIG. 19 is a cross-sectional view illustrating a process of lowering the input piston part 113 in accordance with the exemplary embodiment of the disclosure, and FIG. 20 is a cross-sectional view illustrating a process of raising the input piston part 113 in accordance with the exemplary embodiment of the disclosure.

As illustrated in FIGS. 15, 16, 17, 18, 19, and 20, the input unit 100 may have various shapes without departing from a technical idea that the input unit 100 adjusts the height of the vehicle body 6 by supplying the working fluid 4 to the front wheel output unit 20 and the rear wheel output unit 60 or recovering the supplied working fluid 4. The input unit 100 in accordance with the exemplary embodiment includes the driving part 101, a reduction part 102, a bearing part 103, a lead nut part 104, a lead screw 107, a hydraulic seal member 109, an input housing part 110, the input piston part 113, and a connection part 115.

The driving part 101 is supplied with electric energy and generates rotational power. The driving part 101 in accordance with the exemplary embodiment employs an electric motor, and the reduction part 102 is provided in succession to the driving part 101. The output shaft of the driving part 101 is connected to the reduction part 102, and the output shaft of the reduction part 102 is connected to the lead nut part 104.

The reduction part 102 increases a torque by receiving the power of the driving part 101, and rotates the lead nut part 104. The reduction part 102 is decelerated by using a planetary gear, and the lead nut part 104 is provided in succession to the reduction part 102.

The lead nut part 104 may have various shapes without departing from a technical idea that the lead nut part 104 is threadedly coupled to the outer surface of the lead screw 107 and is rotatably coupled to the input housing part 110. The lead nut part 104 in accordance with the exemplary embodiment includes a lead nut body 105 which has the shape of a pipe extending in the vertical direction, and a lead nut wing 106 which projects in the horizontal direction at the middle portion of the lead nut body 105 and supports the lower end of the bearing part 103.

A thread is formed on the inner surface of the lead nut body 105, and the upper end of the lead nut body 105 is spline-coupled to the reduction part 102 and receives rotational power therefrom.

The lead screw 107 may have various shapes without departing from a technical idea that the lead screw 107 is inserted into the input piston part 113 and is linearly moved in the vertical direction by receiving external power. The lead screw 107 in accordance with the exemplary embodiment has the shape of a screw bar which is formed with a thread on the outer surface thereof. A screw wing 108 extends in the horizontal direction adjacent to the lower end of the lead screw 107.

The lead screw 107 is threadedly coupled to the inner surface of the lead nut body 105, and thus, the rotation of the input piston part 113 which is coupled to the lead screw 107 is prevented or reduced. Therefore, by the rotation of the lead nut part 104, the lead screw 107 and the input piston part 113 are moved in the vertical direction.

The input housing part 110 may have a shape which has a space where the working fluid 4 is stored and which is open at the upper end thereof. The input housing part 110 in accordance with the exemplary embodiment includes an input housing body 111 which has the shape of a pipe extending in the vertical direction, and an input housing cover 112 which closes the lower end of the input housing body 111.

The input piston part 113 may have various shapes without departing from a technical idea that the input piston part 113 is positioned in the input housing part 110 and is moved along the lengthwise direction of the input housing part 110. The input piston part 113 in accordance with the exemplary embodiment forms an opening which is open upward, and is fastened to the lead screw 107.

Since a plurality of projections which project outward from the side surface of the input piston part 113 are inserted into groove parts which are formed on the inner surface of the input housing part 110, the rotation of the input piston part 113 and the lead screw 107 is prevented or reduced.

The connection part 115 may have various shapes without departing from a technical idea that the connection part 115 connects the input piston part 113 and the lead screw 107. The connection part 115 uses at least one of a first locking member 116, a second locking member 117 and a third locking member 118.

Figure 25:
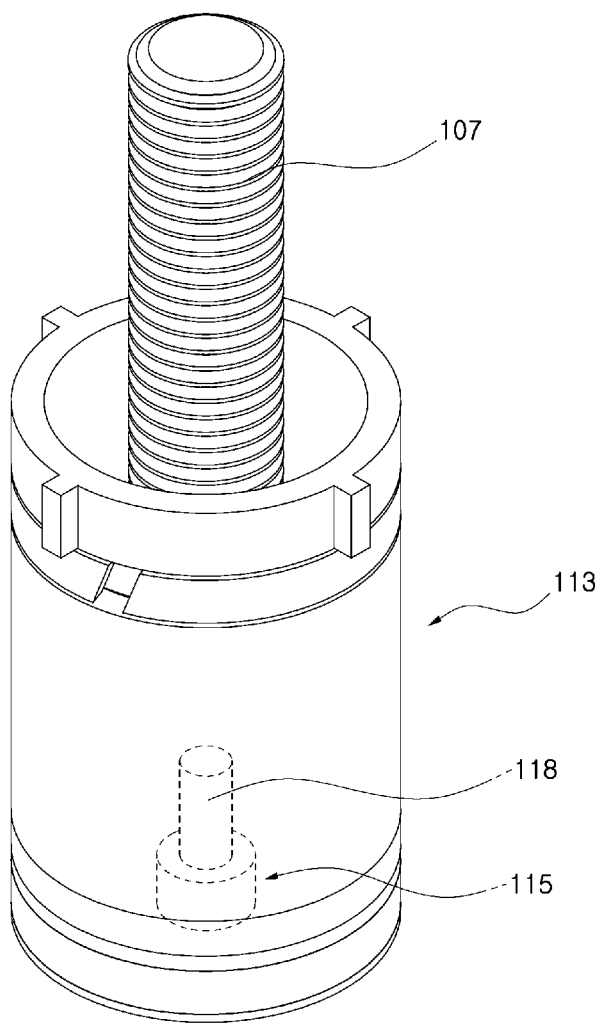
FIG. 25 is a perspective view illustrating a state in which a lead screw and the input piston part are connected by a third locking member in accordance with the exemplary embodiment of the disclosure.
Figure 26:
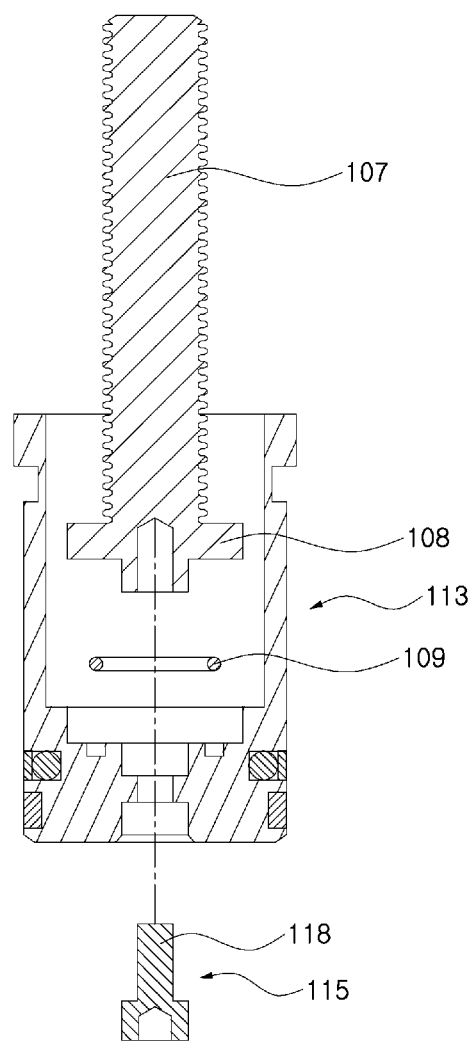
FIG. 26 is a cross-sectional view illustrating the input piston part and the lead screw separated from each other with a hydraulic seal member interposed therebetween, in accordance with the exemplary embodiment of the disclosure.
Figure 27:
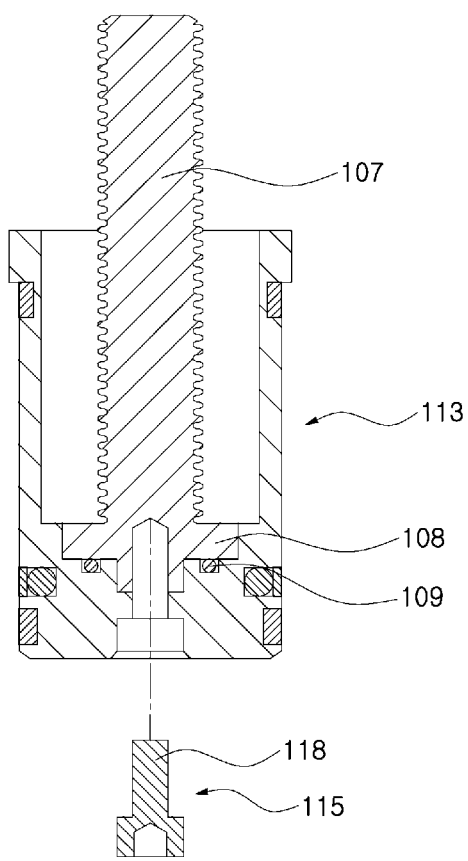
FIG. 27 is a cross-sectional view illustrating the input piston part and the lead screw coupled with each other with the hydraulic seal member interposed therebetween, in accordance with the exemplary embodiment of the disclosure.
Figure 28:
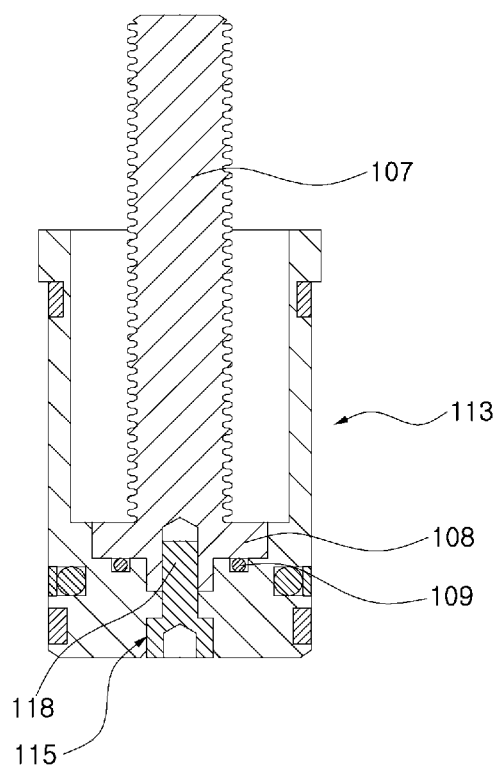
FIG. 28 is a cross-sectional view illustrating a state in which the lead screw and the input piston part are connected with each other by the third locking member in accordance with the exemplary embodiment of the disclosure.

FIG. 25 is a perspective view illustrating a state in which the lead screw 107 and the input piston part are connected by the third locking member 118 in accordance with the exemplary embodiment of the disclosure, FIG. 26 is a cross-sectional view illustrating the input piston part 113 and the lead screw 107 separated from each other with a hydraulic seal member 109 interposed therebetween in accordance with the exemplary embodiment of the disclosure, FIG. 27 is a cross-sectional view illustrating the input piston part 113 and the lead screw 107 coupled with each other with the hydraulic seal member 109 interposed therebetween, in accordance with the exemplary embodiment of the disclosure, and FIG. 28 is a cross-sectional view illustrating a state in which the lead screw 107 and the input piston part 113 are connected with each other by the third locking member 118 in accordance with the exemplary embodiment of the disclosure.

As illustrated in FIGS. 25, 26, 27, and 28, the connection part 115 in accordance with the exemplary embodiment includes the third locking member 118 which passes through and connects the input piston part 113 and the lead screw 107 in the vertical direction.

After the hydraulic seal member 109 is positioned between the screw wing 108 and the input piston part 113, the lead screw 107 and the input piston part 113 are connected with each other by using the third locking member 118, with the screw wing 108 brought into contact with the bottom surface of the input piston part 113.

The third locking member 118 is locked to the lower end of the lead screw 107 through a hole which is defined through the bottom of the input piston part 113, in the vertical direction.

Figure 29:
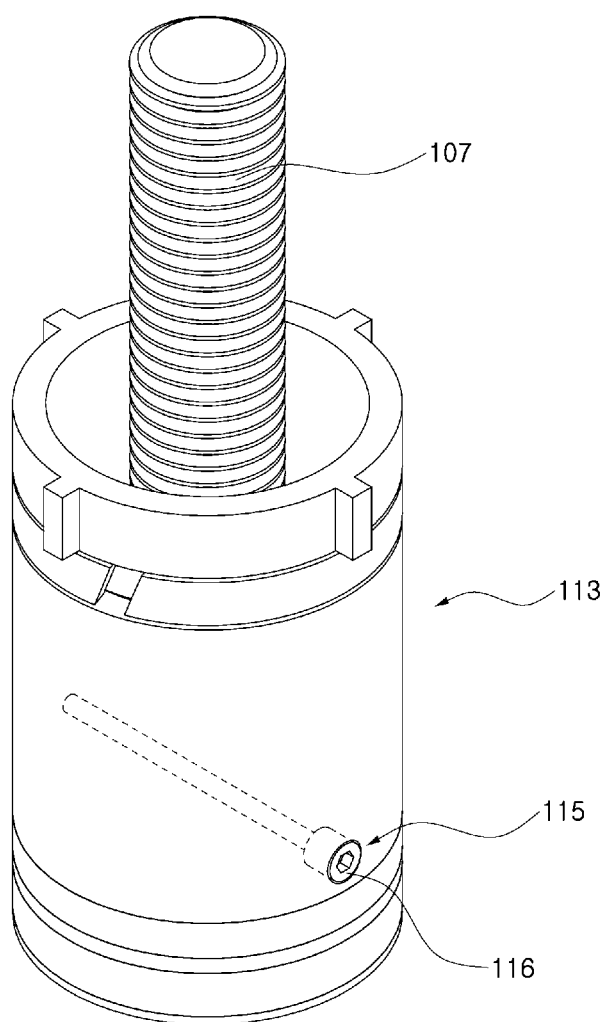
FIG. 29 is a perspective view illustrating a state in which the lead screw and the input piston part are connected with each other by a first locking member in accordance with the exemplary embodiment of the disclosure.
Figure 30:
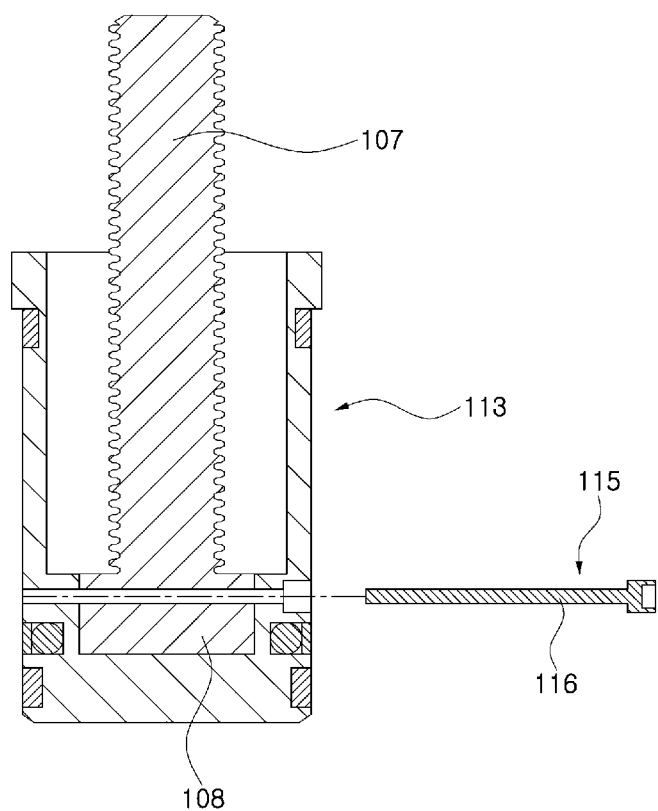
FIG. 30 is a cross-sectional view illustrating the input piston part and the lead screw temporarily assembled, in accordance with the exemplary embodiment of the disclosure.
Figure 31:
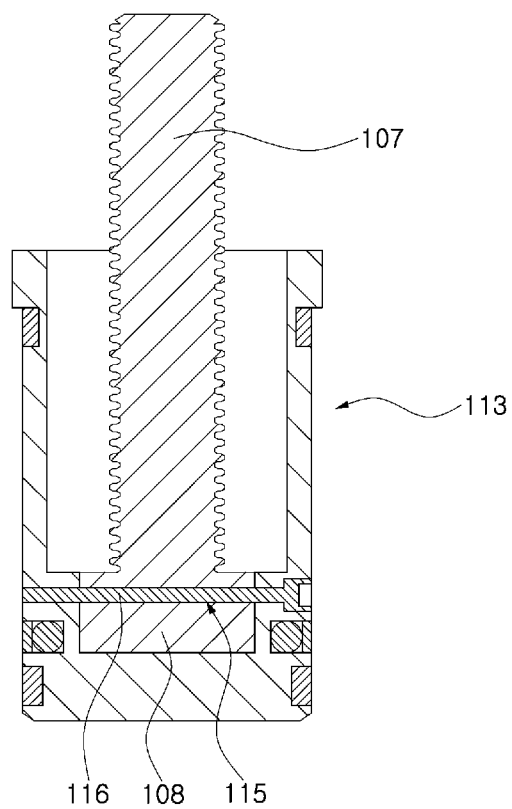
FIG. 31 is a cross-sectional view illustrating the lead screw and the input piston part connected with each other by the first locking member in accordance with the exemplary embodiment of the disclosure.

FIG. 29 is a perspective view illustrating a state in which the lead screw 107 and the input piston part 113 are connected with each other by the first locking member 116 in accordance with the exemplary embodiment of the disclosure, FIG. 30 is a cross-sectional view illustrating the input piston part 113 and the lead screw 107 temporarily assembled, in accordance with the exemplary embodiment of the disclosure, and FIG. 31 is a cross-sectional view illustrating the lead screw 107 and the input piston part 113 connected with each other by the first locking member 116 in accordance with the exemplary embodiment of the disclosure.

As illustrated in FIGS. 29, 30, and 31, the first locking member 116 passes through and connects the input piston part 113 and the lead screw 107 in the horizontal direction. The first locking member 116 in accordance with the exemplary embodiment is locked in the horizontal direction.

The screw wing 108 of the lead screw 107 is inserted into a groove defined at the bottom of the input piston part 113, and, with the screw wing 108 brought into contact with the bottom surface of the input piston part 113, the first locking member 116 is locked in the horizontal direction by passing through the input piston part 113 and the screw wing 108. Therefore, the lead screw 107 is fastened to the input piston part 113 even without using the separate hydraulic seal member 109.

When assembling the input piston part 113 and the lead screw 107, in the case where the hydraulic seal member 109 is provided between the input piston part 113 and the lead screw 107, the hydraulic seal member 109 may break or be degraded in the sealing performance thereof due to the deformation or fluctuation of the lead screw 107 and thus leakage may occur, and due to this fact, the operational performance of the input unit 100 may be degraded.

However, since the lead screw 107 is fastened to the input piston part 113 by the first locking member 116 without using the hydraulic seal member 109, the number of parts and the manufacturing cost may be reduced and the durability performance of the input unit 100 may be improved, due to the omission of the hydraulic seal member 109.

After, as illustrated in FIG. 30, aligning a hole which is defined through the lead screw 107 and a hole which is defined through the input piston part 113, the first locking member 116 is locked in the horizontal direction as illustrated in FIG. 31. Therefore, even without using the hydraulic seal member 109, because a hole having a high possibility of leakage is not formed through the lower end of the input piston part 113, leakage suppression performance may be improved.

Figure 32:
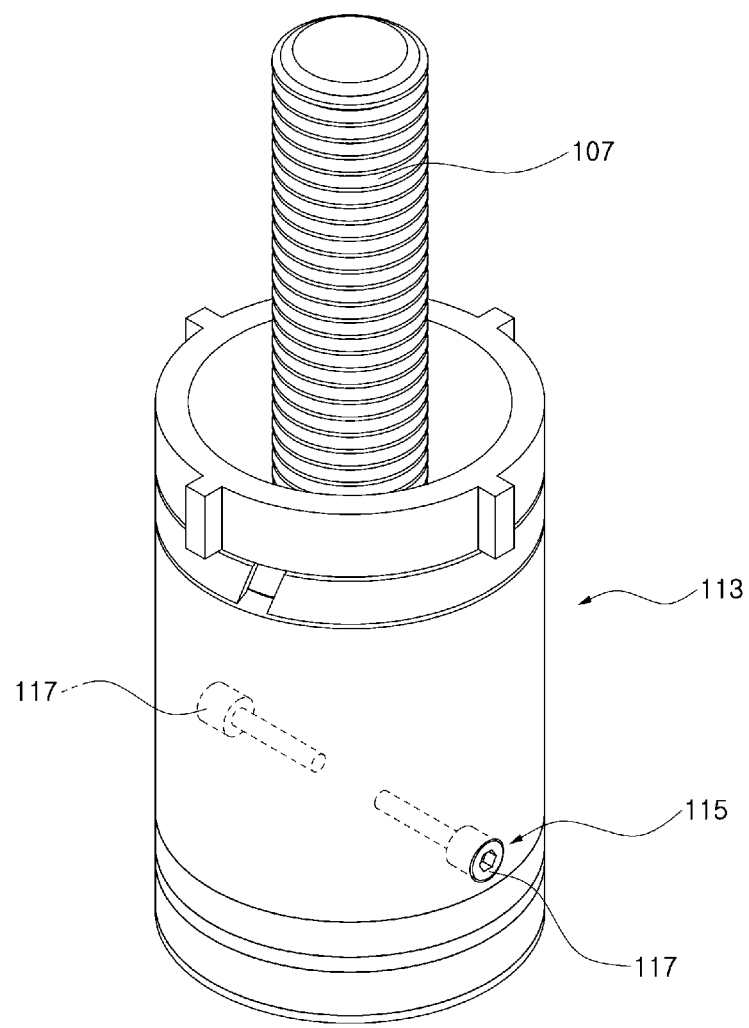
FIG. 32 is a perspective view illustrating the lead screw and the input piston part connected with each other by a second locking member in accordance with the exemplary embodiment of the disclosure.
Figure 33:
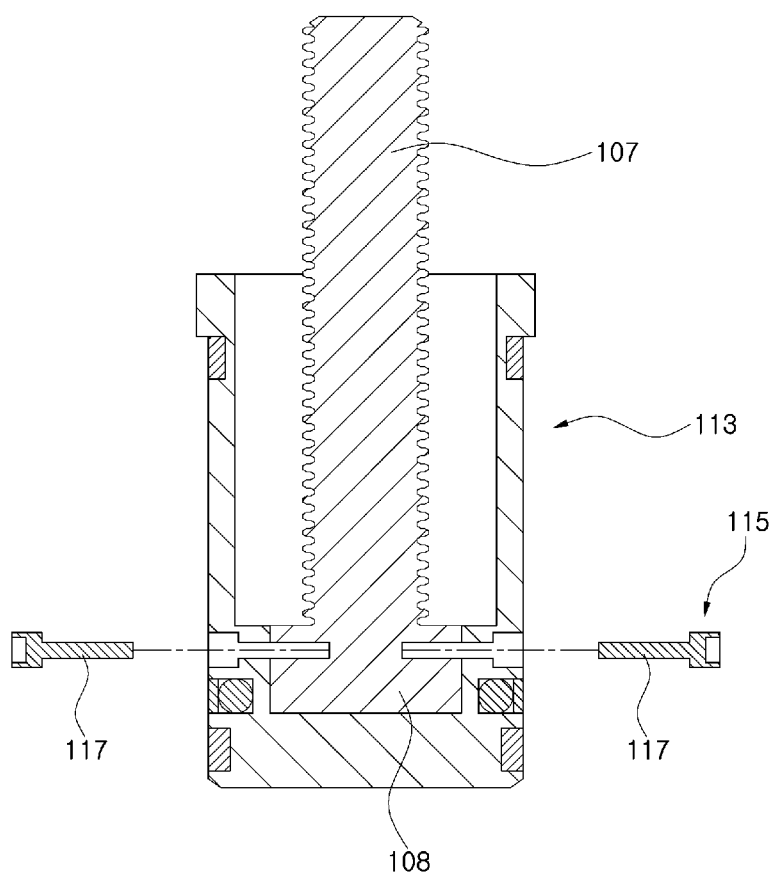
FIG. 33 is a cross-sectional view illustrating the input piston part and the lead screw temporarily assembled, in accordance with the exemplary embodiment of the disclosure.
Figure 34:
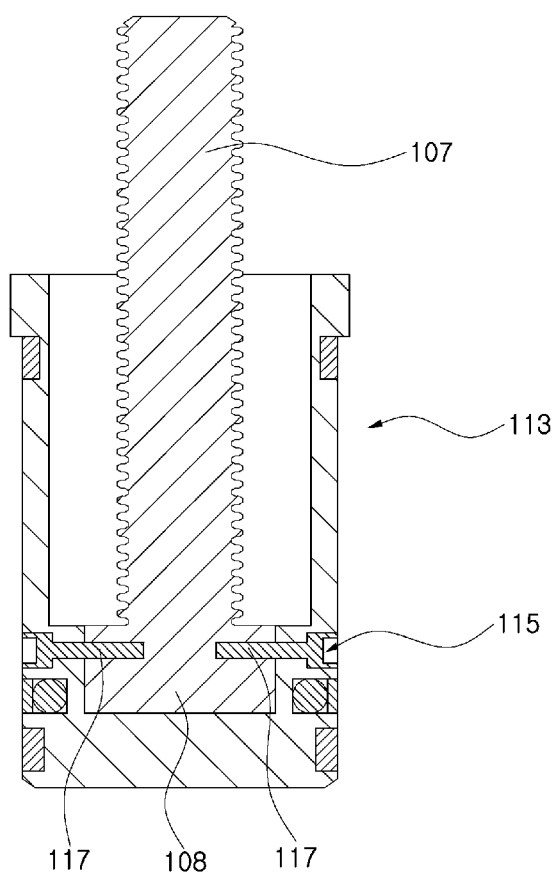
FIG. 34 is a cross-sectional view illustrating the lead screw and the input piston part connected with each other by the second locking member in accordance with the exemplary embodiment of the disclosure.

FIG. 32 is a perspective view illustrating the lead screw 107 and the input piston part 113 connected with each other by the second locking member 117 in accordance with the exemplary embodiment of the disclosure, FIG. 33 is a cross-sectional view illustrating the input piston part 113 and the lead screw 107 temporarily assembled, in accordance with the exemplary embodiment of the disclosure, and FIG. 34 is a cross-sectional view illustrating the lead screw 107 and the input piston part 113 connected with each other by the second locking member 117 in accordance with the exemplary embodiment of the disclosure.

As illustrated in FIGS. 32, 33, and 34, the second locking member 117 may have various shapes without departing from a technical idea that the second locking member 117 passes through the input piston part 113 and is locked to the lead screw 107. Accordance with the exemplary embodiment, The second locking member 117 may be provided in a plural number around the lead screw 107.

The second locking member 117 is also assembled in the horizontal direction in the same manner as the first locking member 116, and at least two locking members are provided in a plural number around the input piston part 113. Since a way for fastening the second locking member 117 is similar to or the same as the way for fastening the first locking member 116, detailed description thereof will be omitted herein.

Figure 21:
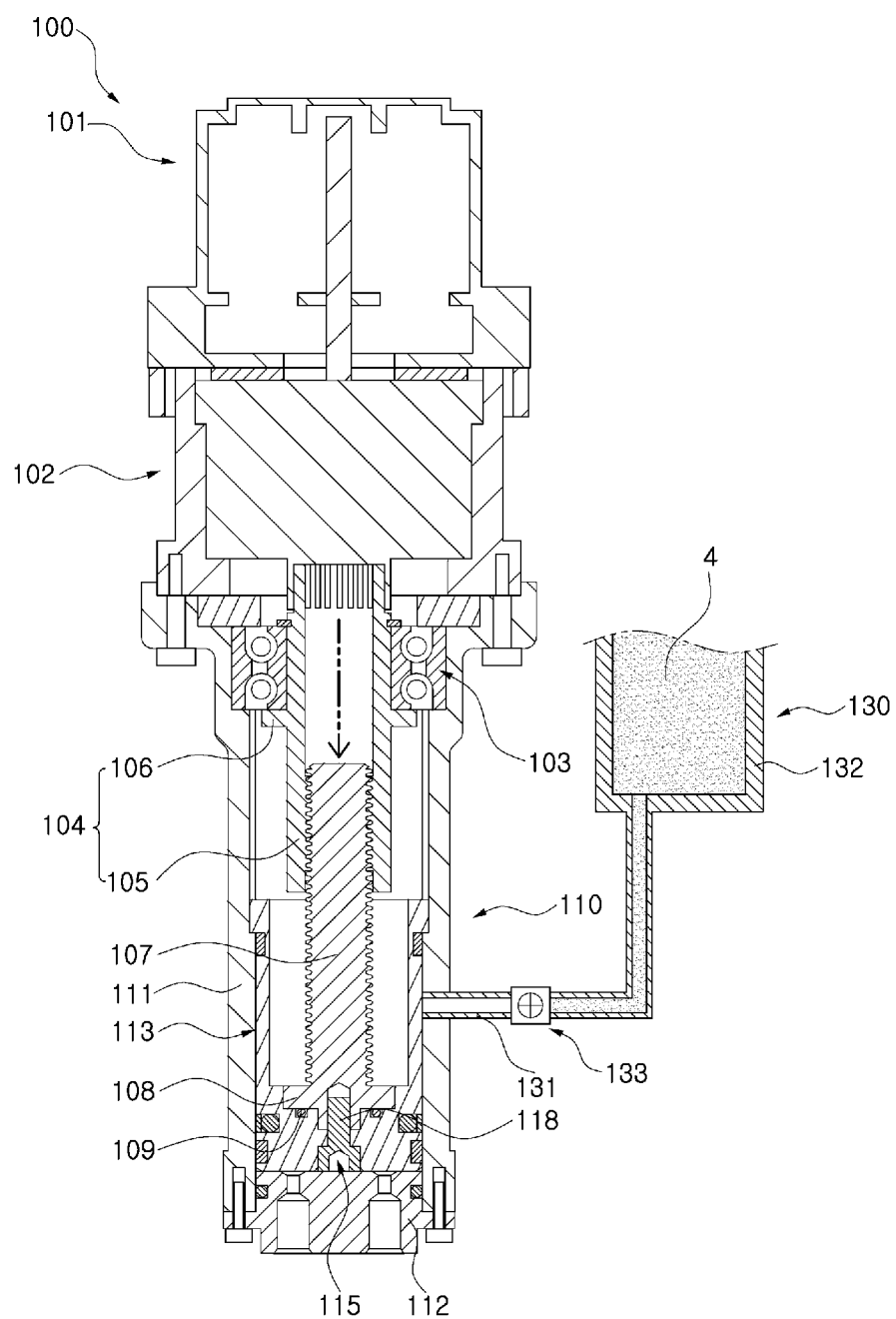
FIG. 21 is a cross-sectional view illustrating a replenishment unit connected to the input unit in accordance with the exemplary embodiment of the disclosure.
Figure 22:
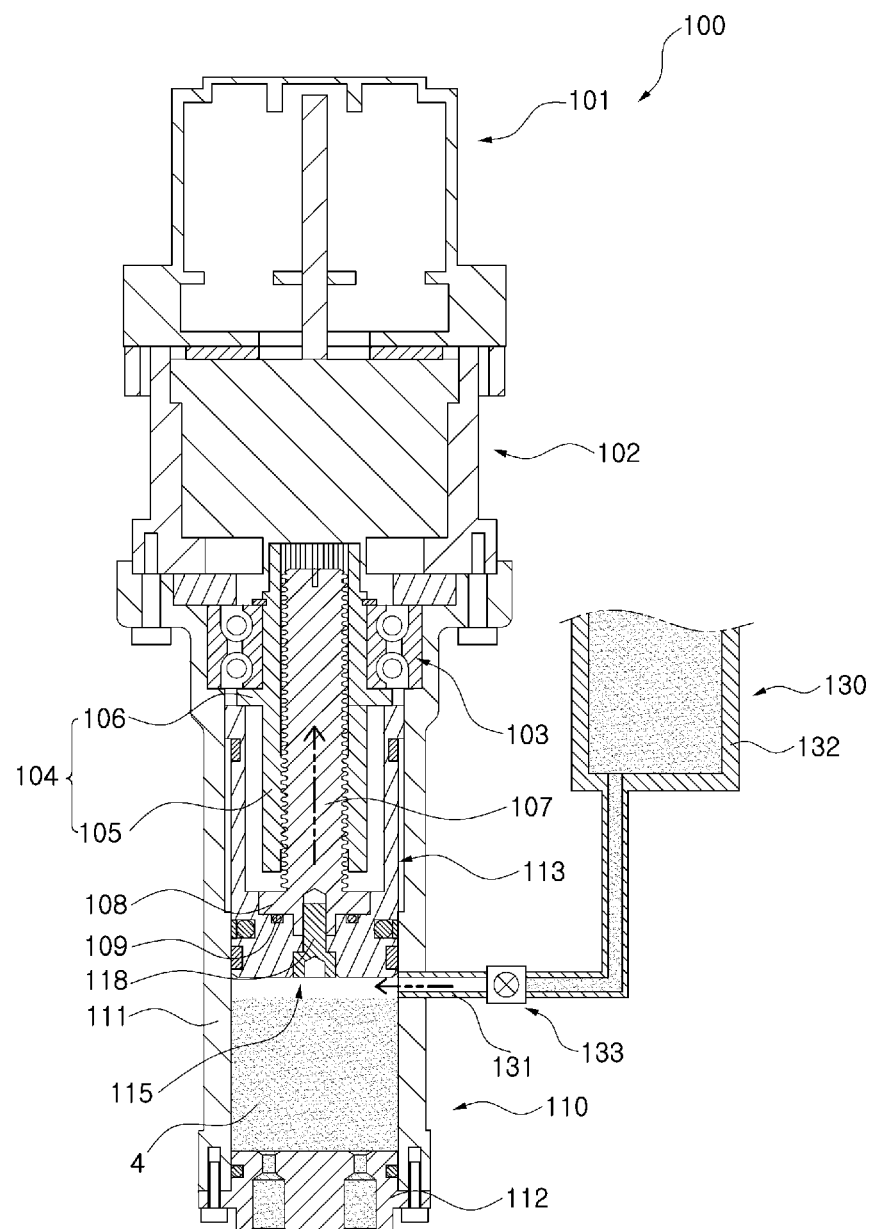
FIG. 22 is a cross-sectional view illustrating a process of transferring working fluid stored in the replenishment unit to the input unit in accordance with the exemplary embodiment of the disclosure.
Figure 23:
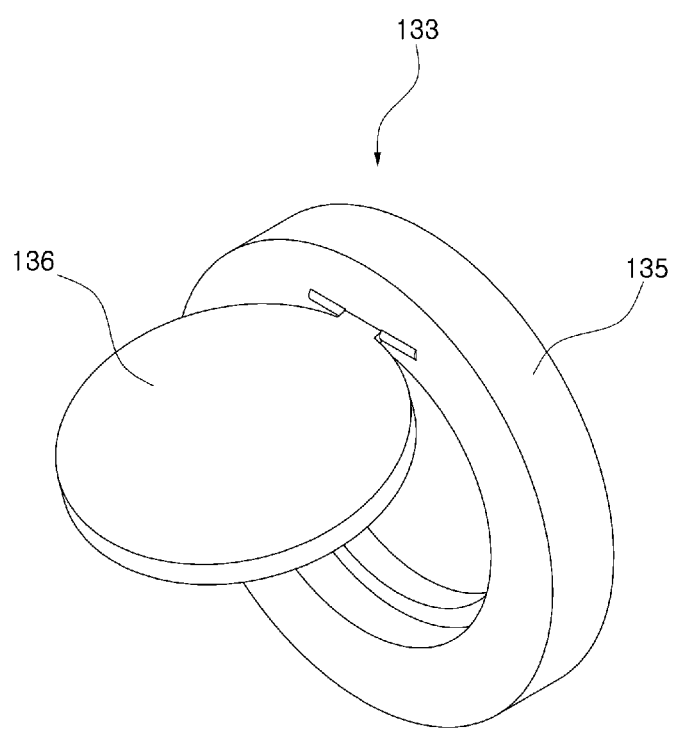
FIG. 23 is a perspective view illustrating a valve part in accordance with the exemplary embodiment of the disclosure.
Figure 24:
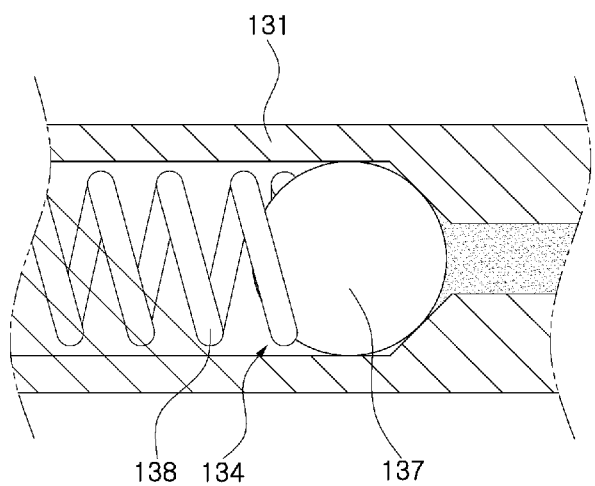
FIG. 24 is a cross-sectional view illustrating a different type of valve part in accordance with the exemplary embodiment of the disclosure.

FIG. 21 is a cross-sectional view illustrating the replenishment unit 130 connected to the input unit 100 in accordance with the exemplary embodiment of the disclosure, FIG. 22 is a cross-sectional view illustrating a process of transferring working fluid 4 stored in the replenishment unit 130 to the input unit 100 in accordance with the exemplary embodiment of the disclosure, FIG. 23 is a perspective view illustrating a valve part 133 in accordance with the exemplary embodiment of the disclosure, and FIG. 24 is a cross-sectional view illustrating a different type of valve part 133 in accordance with the exemplary embodiment of the disclosure.

As illustrated in FIGS. 21, 22, 23, and 24, the replenishment unit 130 may have various shapes without departing from a technical idea that the replenishment unit 130 is connected to the input unit 100 and supplies the working fluid 4 into the input unit 100 in the case where the working fluid 4 stored in the input unit 100 is insufficient. The replenishment unit 130 in accordance with the exemplary embodiment includes a supply pipe 131, a tank part 132, and a valve part 133.

By a hydraulic pressure generated as the input unit 100 linearly moves the input piston part 113 upward and downward like a syringe, the output unit 10 is operated and adjusts the height of the vehicle body 6. In the case where leakage occurs by the operation of the input unit 100, the replenishment unit 130 is configured to replenish a leaked amount of the working fluid 4.

The supply pipe 131 is a pipe which connects the tank part 132 and the input unit 100 and supplies the working fluid 4 stored in the tank part 132, into the input unit 100. The supply pipe 131 in accordance with the exemplary embodiment is connected to the sidewall of the input housing part 110 which forms an empty space due to leakage.

As illustrated in FIG. 22, in the case where the input piston part 113 is raised to a maximum height, an empty space is formed by an amount by which the working fluid 4 leaks. Thus, in the case where the input piston part 113 is raised to the maximum height, the supply pipe 131 is connected to the sidewall of the input housing part 110 under the input piston part 113.

The tank part 132 is connected to the supply pipe 131, and the working fluid 4 for replenishment is stored in the tank part 132. The valve part 133 is provided in the supply pipe 131, and permits unidirectional flow of the working fluid 4 from the tank part 132 to the input housing part 110.

As illustrated in FIGS. 22 and 23, the valve part 133 includes a valve frame 135 which is fastened to the supply pipe 131, and a valve door 136 which is rotatably coupled to the valve frame 135 and permits the flow of the working fluid 4 toward the input housing part 110 by being rotated only when the internal pressure of the input housing part 110 is equal to or less than a predetermined pressure.

The valve frame 135 having a ring shape is fastened inside the supply pipe 131, and the valve door 136 is rotatably coupled to the valve frame 135. The valve door 136 has a circular plate shape, and a spring member is separately assembled at a position where the valve door 136 is connected to the valve frame 135 and biases the valve door 136 in a counterclockwise direction (when viewed in FIG. 23). In a state in which the valve door 136 closes the passage of the valve frame 135, since the valve door 136 is caught by a step portion which is formed in the valve frame 135, the additional rotation of the valve door 136 in the counterclockwise direction is prevented or reduced.

Thus, in the case where a vacuum pressure is generated in the input housing part 110 due to the lack of the working fluid 4, since the vacuum pressure is larger than the force of the spring which biases the valve door 136, the valve door 136 may be rotated and the working fluid 4 in the tank part 132 may flow to the input housing part 110.

As illustrated in FIG. 24, a valve part 134 according to another exemplary embodiment includes a ball member 137 and a valve elastic member 138. The ball member 137 has a spherical shape and is caught inside the supply pipe 131. At a region where the ball member 137 is provided, the supply pipe 131 has a flow path that gradually narrows from the input unit 100 toward the tank part 132.

The valve elastic member 138 uses a member such as a spring, and biases the ball member 137 toward the tank part 132. Therefore, in the case where a vacuum pressure is generated due to the lack of the working fluid 4, the working fluid 4 stored in the tank part 132 pushes away the ball member 137 and flows into the input housing part 110.

As illustrated in FIGS. 21 and 22, when the input piston part 113 of the input unit 100 is raised to a highest position, the supply pipe 131 is connected to the input housing part 110 at a position immediately under the input piston part 113. The supply pipe 131 is connected to the tank part 132, and the valve part 133 as a check value is provided in the supply pipe 131.

When the input piston part 113 is raised to the highest position, a negative pressure or a vacuum is generated by an amount by which the working fluid 4 lacks. By the pressure generated at this time, the valve part 133 is opened, and the working fluid 4 stored in the tank part 132 flows into the input housing part 110 to replenish an insufficient amount of the working fluid 4, whereby the durability of the input unit 100 and the output unit 10 may be improved.

As illustrated in FIG. 21, if the input piston part 113 is moved downward, since the atmospheric pressure is formed at the position where the input housing part 110 is connected to the supply pipe 131, the valve part 133 is not operated.

As illustrated in FIG. 22, if the input piston part 113 is moved to the highest position, the vehicle body 6 is in the low mode, and, a negative pressure is generated by an amount of the working fluid 4 leaked, which in turn, opens the valve part 133, and the working fluid 4 stored in the tank part 132 flows through the valve part 133 and is replenished into the input housing part 110.

As illustrated in FIGS. 3 and 52, the hydraulic pressure measurement unit 140 is connected to the input unit 100, measures a hydraulic pressure of the working fluid 4, and transfers a measurement value to the control unit 150. The vehicle height sensor 180 measures a height of the vehicle body 6. The vehicle height sensor 180 may measure a height of the vehicle body 6 by radiation of light rays, and various methods such as a method of measuring a height change of the vehicle body 6 by measuring the rotation of a mechanism according to the height change of the vehicle body 6 may be used.

The displacement sensor 160 measures a process displacement of the output unit 10. The displacement sensor 160 in accordance with the exemplary embodiment measures a length change of the front wheel output unit 20 and a length change of the rear wheel output unit 60.

The rotation measurement sensor 170 measures an rpm of the driving part 101 which is provided in the input unit 100. As the rotation measurement sensor 170, an encoder or the like may be used.

The control unit 150 receives measurement values of the hydraulic pressure measurement unit 140, the displacement sensor 160, the rotation measurement sensor 170 and the vehicle height sensor 180, and calculates a displacement of the output unit 10 and a load change in the vehicle body 6.

In the high mode in which the length of the output unit 10 is longest, the height of the vehicle body 6 is kept highest, and the measurement value of the hydraulic pressure measurement unit 140 is largest.

In the low mode in which the length of the output unit 10 is shortest, the height of the vehicle body 6 is kept lowest, and the measurement value of the hydraulic pressure measurement unit 140 is smallest.

Figure 41:
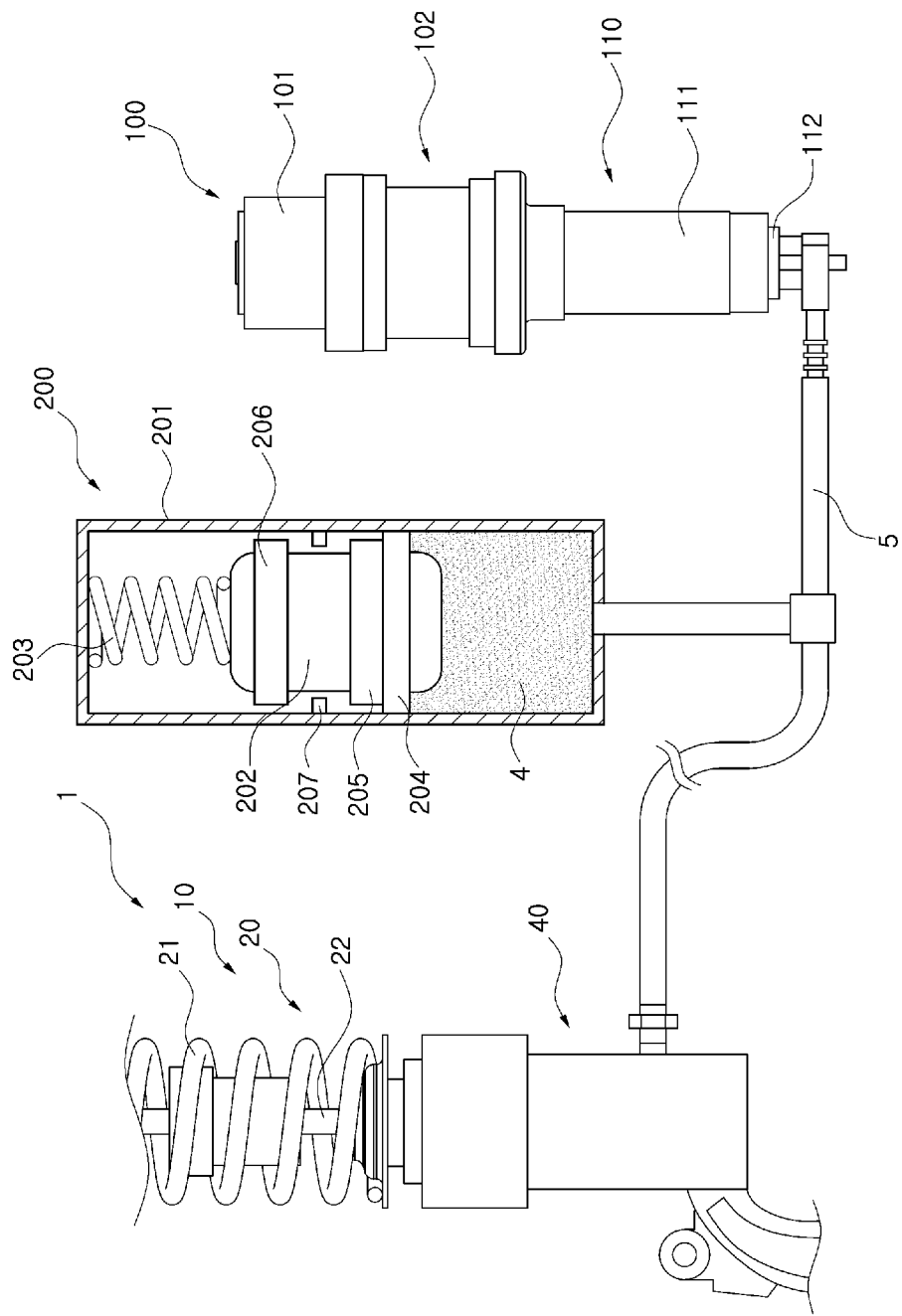
FIG. 41 is a view illustrating a stiffness adjustment unit connected to a connection pipe, in accordance with the exemplary embodiment of the disclosure.
Figure 42:
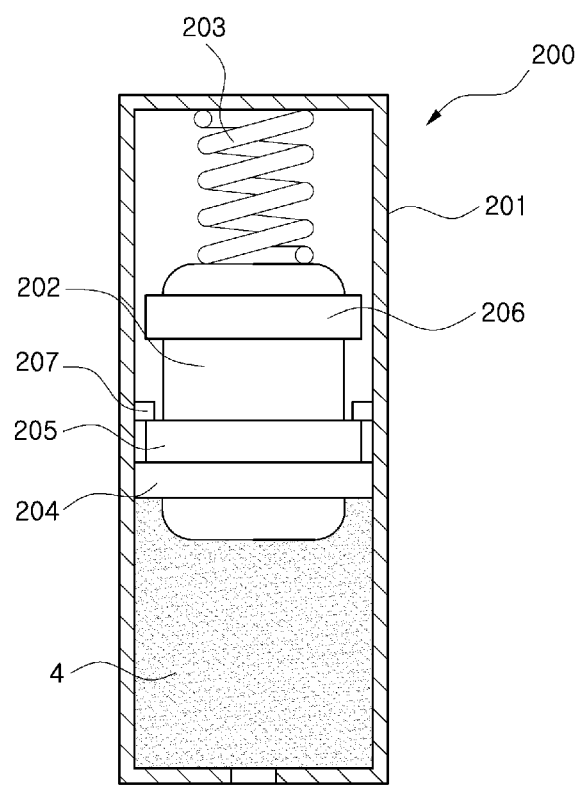
FIG. 42 is a cross-sectional view illustrating a first stopper being brought into contact with a fixed stopper in accordance with the exemplary embodiment of the disclosure.
Figure 43:
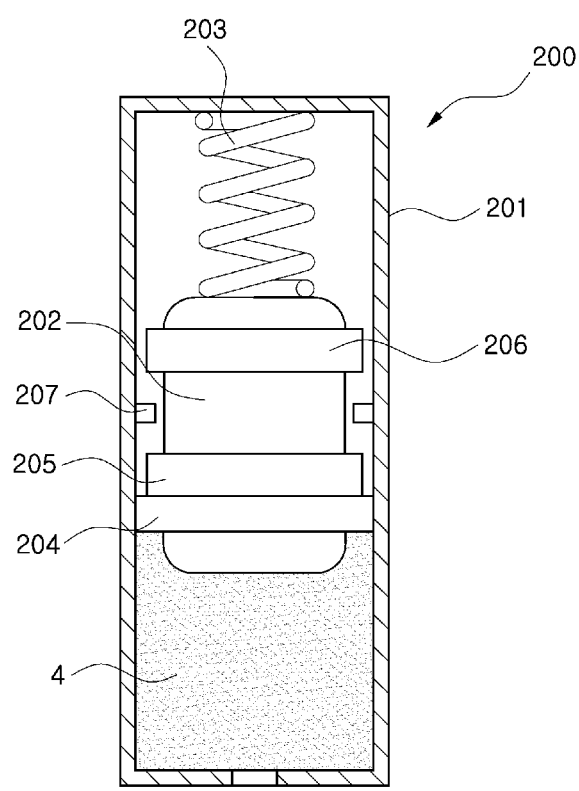
FIG. 43 is a cross-sectional view illustrating the fixed stopper positioned between the first stopper and a second stopper in accordance with the exemplary embodiment of the disclosure.
Figure 44:
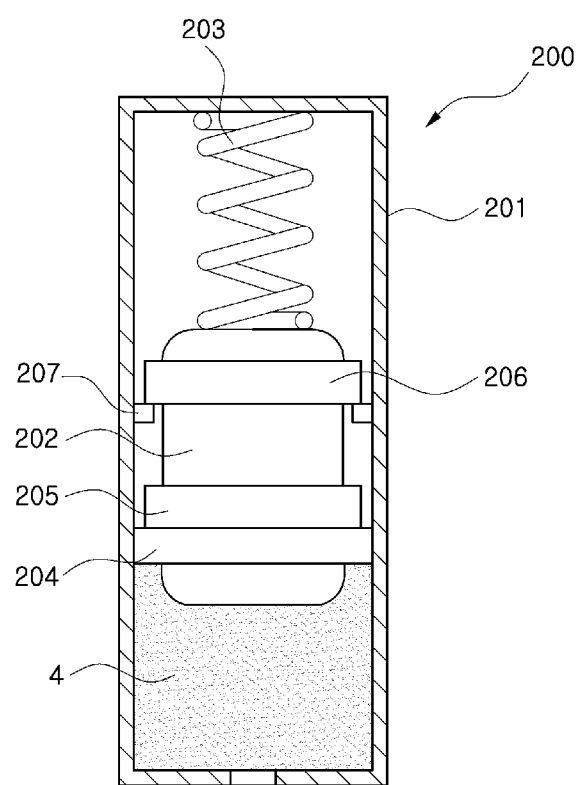
FIG. 44 is a cross-sectional view illustrating the second stopper being brought into contact with the fixed stopper in accordance with the exemplary embodiment of the disclosure.

FIG. 41 is a view illustrating the stiffness adjustment unit 200 connected to a connection pipe 5, in accordance with the exemplary embodiment of the disclosure, FIG. 42 is a cross-sectional view illustrating a first stopper 205 being brought into contact with a fixed stopper 207 in accordance with the exemplary embodiment of the disclosure, FIG. 43 is a cross-sectional view illustrating the fixed stopper 207 positioned between the first stopper 205 and a second stopper 206, in accordance with the exemplary embodiment of the disclosure, and FIG. 44 is a cross-sectional view illustrating the second stopper 206 being brought into contact with the fixed stopper 207 in accordance with the exemplary embodiment of the disclosure.

As illustrated in FIGS. 41, 42, 43, and 44, the stiffness adjustment unit 200 may have various shapes without departing from a technical idea that the stiffness adjustment unit 200 is provided between the output unit 10 and the input unit 100 and adjusts the stiffness of the working fluid 4 to be supplied to the output unit 10. The stiffness adjustment unit 200 in accordance with the exemplary embodiment is provided between the front wheel output unit 20 and the input unit 100, and includes a stiffness adjustment body 201, a floating piston 202, an adjustment spring 203, a sealing member 204, a first stopper 205, a second stopper 206, and a fixed stopper 207.

The output unit 10 to which the stiffness adjustment unit 200 is connected is the front wheel output unit 20 which adjusts the height of the front wheel-side vehicle body 6, and includes the first elastic part 21 which elastically supports the vehicle body 6.

The stiffness adjustment body 201 is connected to the output unit 10 and the input unit 100 through a pipe, and the working fluid 4 is stored in the stiffness adjustment body 201. The working fluid 4 is stored in the lower part of the stiffness adjustment body 201, and the floating piston 202 and the adjustment spring 203 are sequentially assembled in the upper part of the stiffness adjustment body 201.

The floating piston 202 is positioned in the stiffness adjustment body 201, and is moved in the vertical direction by being pushed by the working fluid 4. The sealing member 204 may have a shape which surrounds the outer surface of the floating piston 202, and prevents or reduces the working fluid 4 from flowing between the outer surface of the floating piston 202 and the inner surface of the stiffness adjustment body 201.

The adjustment spring 203 is positioned on the floating piston 202, and biases the floating piston 202 downward.

The first stopper 205 projects outward from the side surface of the floating piston 202. The second stopper 206 is positioned above the first stopper 205 to face the first stopper 205, and projects outward from the side surface of the floating piston 202. The fixed stopper 207 positioned between the first stopper 205 and the second stopper 206, and projects inward from the inner surface of the stiffness adjustment body 201.

As illustrated in FIG. 43, in a mid mode in which the fixed stopper 207 is separated from the first stopper 205 and the second stopper 206, the adjustment spring 203 and the first elastic part 21 reduce a pressure change of the working fluid 4.

As the stiffness adjustment unit 200 is used, stiffness may be changed depending on a height of the vehicle body 6. Since a case where the vehicle body 6 is in the high mode corresponds to a case where a vehicle travels off road, the stiffness of the working fluid 4 needs to be high. Also, since a case where the vehicle body 6 is in the low mode corresponds to a case where a vehicle travels at a high speed, the stiffness of the working fluid 4 needs to be high.

Since a case where the vehicle body 6 is in the mid mode corresponds to a usual running mode, the stiffness of the working fluid 4 needs to be lower than the case of the low mode. Therefore, by changing stiffness in a vehicle depending on a height of the vehicle body 6, ride quality and driving stability may be increased.

The stiffness adjustment unit 200 is an accumulator for stiffness adjustment, and a spring stiffness of the adjustment spring 203 which is provided in the stiffness adjustment unit 200 is set to $k_2$. A spring stiffness of the first elastic part 21 which is provided in the output unit 10 is set to $k_1$, and the stiffness of the vehicle body 6 is optimally set in the case where the vehicle body 6 is in the mid mode.

On the assumption that the adjustment spring 203 and the first elastic part 21 are connected in series, $K_{vehicle}$ as optimal stiffness in the case where the vehicle body 6 is in the mid mode is calculated as follows.

$$1/K_{vehicle}=1/k_1+1/k_2.$$

In the case where the height of the vehicle body 6 is in the mid mode, a load change in the output unit 10 causes a pressure change in the output unit 10, and the stiffness adjustment unit 200 receives the pressure change and absorbs vibration with the stiffness of $k_2$.

As illustrated in FIGS. 3 and 44, in the low mode in which the length of the output unit 10 decreases and the height of the vehicle body 6 decreases, the second stopper 206 is caught by the fixed stopper 207. In the low mode, the input unit 100 is operated, and the working fluid 4 flows from the output unit 10 to the input unit 100. At this time, as the working fluid 4 in the stiffness adjustment unit 200 also flows to the input unit 100, the floating piston 202 is moved downward.

In the low mode, the pressure of the working fluid 4 is lowest, and due to this fact, a hydraulic pressure change of the working fluid 4 cannot be transferred to the stiffness adjustment unit 200.

Thus, $K_{vehicle}=k_1$ results.

As the stiffness adjustment unit 200 is provided between the output unit 10 and the input unit 100, stiffness may be increased in the high mode and the low mode and may be decreased in the mid mode, whereby the driving stability and ride quality of a vehicle may be improved.

As illustrated in FIGS. 4 and 42, in the high mode in which the length of the output unit 10 increases and the height of the vehicle body 6 increases, the first stopper 205 is caught by the fixed stopper 207. In the high mode, the input unit 100 is operated, and the working fluid 4 flows to the output unit 10. At this time, the working fluid 4 is also supplied to the stiffness adjustment unit 200, and the floating piston 202 is moved upward.

The output unit 10 operates in the high mode, the mid mode and the low mode depending on a height of the vehicle body 6, and the hydraulic pressure of the working fluid 4 is highest in the high mode and is lowest in the low mode.

In the high mode, since a hydraulic pressure is high, the movement of the floating piston 202 in the stiffness adjustment body 201 is prevented or reduced by the fixed stopper 207, and thus, the influence of $k_2$ as the spring stiffness of the adjustment spring 203 disappears. Thus, $K_{vehicle}=k_1$ results.

Figure 45:
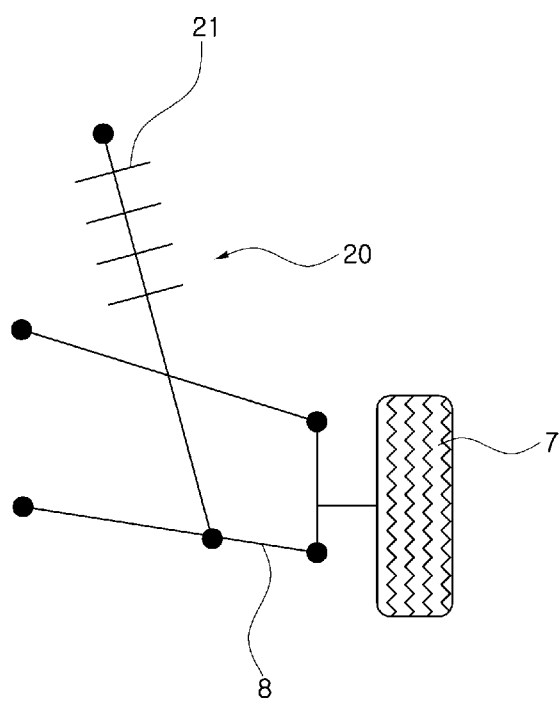
FIG. 45 is a diagram schematically illustrating the front wheel output unit in accordance with the exemplary embodiment of the disclosure.
Figure 46:
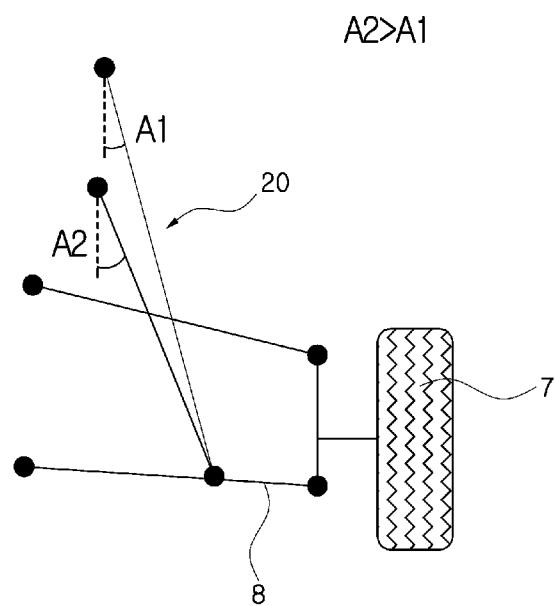
FIG. 46 is a diagram schematically illustrating the vehicle height adjustment system operating in the high mode and the low mode, in accordance with the exemplary embodiment of the disclosure.
Figure 47:
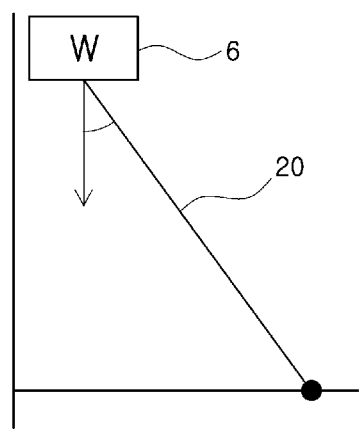
FIG. 47 is a diagram schematically illustrating the front wheel output unit connected to the vehicle body with a load of the connected vehicle body applied to the front wheel output unit, in accordance with the exemplary embodiment of the disclosure.
Figure 48:
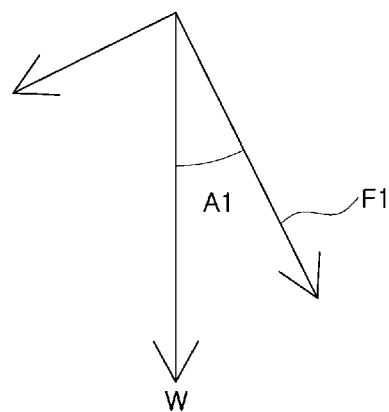
FIG. 48 is a diagram illustrating a first load transferred to the front wheel output unit when the vehicle height adjustment system is operated in the high mode in accordance with the exemplary embodiment of the disclosure.
Figure 49:
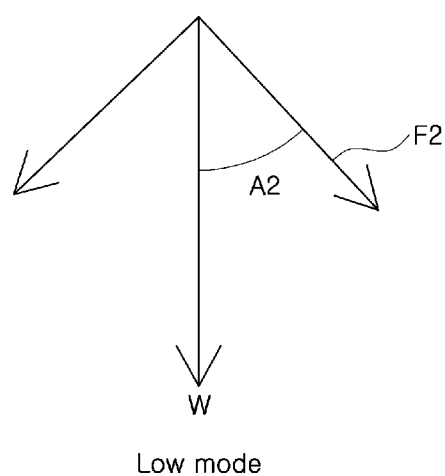
FIG. 49 is a diagram illustrating a second load transferred to the front wheel output unit when the vehicle height adjustment system is operated in the low mode in accordance with the exemplary embodiment of the disclosure.

FIG. 45 is a diagram schematically illustrating the front wheel output unit 20 in accordance with the exemplary embodiment of the disclosure, FIG. 46 is a diagram schematically illustrating the vehicle height adjustment system operating in the high mode and the low mode, in accordance with the exemplary embodiment of the disclosure, FIG. 47 is a diagram schematically illustrating the front wheel output unit 20 connected to the vehicle body 6 with a load of the vehicle body 6 applied to the front wheel output unit 20, in accordance with the exemplary embodiment of the disclosure, FIG. 48 is a diagram illustrating a first load transferred to the front wheel output unit 20 when the vehicle height adjustment system is operated in the high mode in accordance with the exemplary embodiment of the disclosure, and FIG. 49 is a diagram illustrating a second load transferred to the front wheel output unit 20 when the vehicle height adjustment system is operated in the low mode in accordance with the exemplary embodiment of the disclosure.

As illustrated in FIGS. 45, 46, 47, 48, and 49 and 52, a length change of the front wheel output unit 20 may be calculated by using the hydraulic pressure measurement unit 140.

As illustrated in FIG. 45, the front wheel output unit 20 is provided on the wheel support 8 which supports the wheel 7. Since the front wheel output unit 20 supports the vehicle body 6, a height of the vehicle body 6 changes depending on a length change of the front wheel output unit 20.

As illustrated in FIG. 46, in the high mode in which the length of the front wheel output unit 20 is increased to the maximum, an angle formed by the front wheel output unit 20 and a virtual vertical line becomes A1. In the low mode in which the length of the front wheel output unit 20 is reduced to the minimum, an angle formed by the front wheel output unit 20 and a virtual vertical line becomes A2.

As illustrated in FIG. 47, in a state in which a force by a load W of the vehicle body 6 act in the direction of a vertical line and the front wheel output unit 20 is connected to the vehicle body 6, the magnitude of a force to be transferred to the front wheel output unit 20 is changed depending on a change in an angle formed by the front wheel output unit 20 and the vertical line.

As illustrated in FIG. 48, a force applied to the front wheel output unit 20 in the high mode is F1, and an angle formed by F1 and the vertical load W is A1.

As illustrated in FIG. 49, a force applied to the front wheel output unit 20 in the low mode is F2, and an angle formed by F2 and the vertical load W is A2. A1 is smaller than A2, and F1 is larger than F2.

In this way, a height of the vehicle body 6 is changed depending on a length change of the front wheel output unit 20. Accordingly, a force to be transferred to the front wheel output unit 20 is changed, and a pressure of the working fluid 4 which operates the front wheel output unit 20 is also changed.

Therefore, the control unit 150 may calculate a change in the length of the front wheel output unit 20, through a change in a hydraulic pressure measured by the hydraulic pressure measurement unit 140. A hydraulic pressure value of the working fluid 4 is smallest in the low mode, and is largest in the high mode.

Meanwhile, as illustrated in FIGS. 35 and 36, in the rear wheel output unit 60, the vehicle piston part 62 and the vehicle cylinder part 66 are positioned on the second elastic part 61, and the length of the rear wheel output unit 60 is changed as the vehicle piston part 62 is moved by the supply of the working fluid 4.

The load axis of the second elastic part 61 as a spring is changed by the movement of the vehicle piston part 62, and due to this fact, a wheel rate is changed. Due to a change in wheel rate, a vehicle height adjustment amount and a load by the operation of the rear wheel output unit 60 are changed.

As the length of the rear wheel output unit 60 is changed, a hydraulic pressure value of the working fluid 4 is changed. By measuring such a hydraulic pressure value, a displacement of the rear wheel output unit 60 may be estimated.

In the device 1 for adjusting a height of a vehicle in accordance with the exemplary embodiment, a displacement of the output unit 10 may be estimated through the hydraulic pressure measurement unit 140 mounted instead of a sensor for sensing a displacement of the output unit 10. In this case, by removing the displacement sensor 160 of the output unit 10, the number of parts and the manufacturing cost may be reduced.

Figure 50:
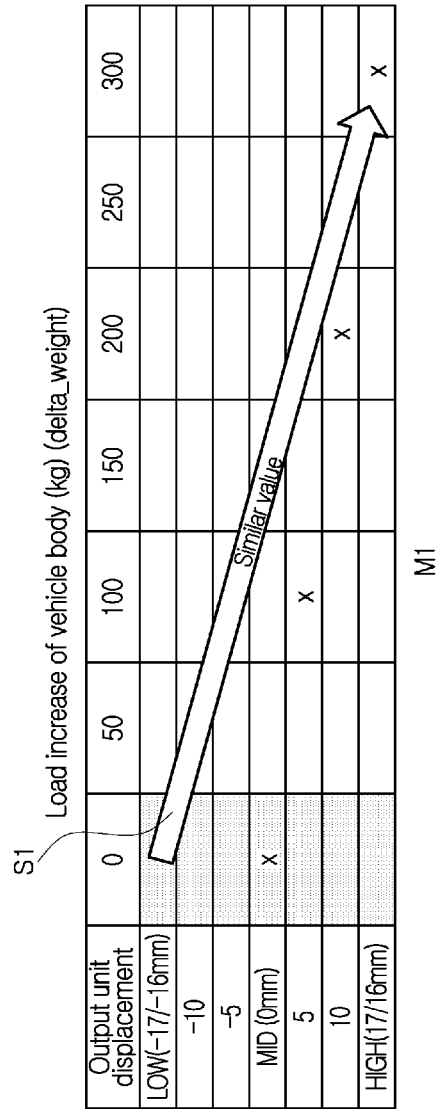
FIG. 50 is a diagram illustrating a first table stored in a control unit in accordance with the exemplary embodiment of the disclosure.
Figure 51:
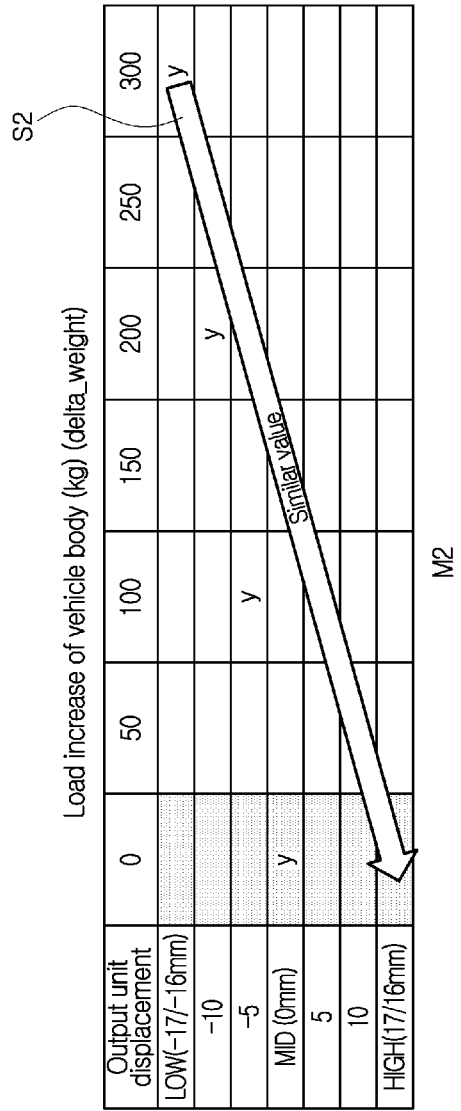
FIG. 51 is a diagram illustrating a second table stored in the control unit in accordance with the exemplary embodiment of the disclosure.

FIG. 50 is a diagram illustrating a first table stored in the control unit 150 in accordance with the exemplary embodiment of the disclosure, and FIG. 51 is a diagram illustrating a second table stored in the control unit 150 in accordance with the exemplary embodiment of the disclosure.

As illustrated in FIGS. 50 and 52, in the control unit 150, there is stored a first table M1 in which, when X data indicates an increase in the load of the vehicle body 6 and Y data indicates an increase in the displacement of the output unit 10, the same value from the vehicle height sensor 180 represents a first line 51 that slopes right downward.

In the first table M1 in accordance with the exemplary embodiments, X data as horizontal data indicates an increase in the load of the vehicle body 6, and increases in the unit of 50 kg from left to right. In the first table M1, Y data as vertical data indicates an increase in the displacement of the output unit 10. The displacement of the output unit 10 is set to 0 in the mid mode, is set to a positive number in the high mode, and is set to a negative number in the low mode, and the displacement of the output unit 10 gradually increases from the top toward the bottom.

In the first table M1, a value of the vehicle height sensor 180 is largest at the left bottom end, and is smallest at the right top end. The first table M1 has Y data arranged vertically, and, in the Y data, the displacement of the output unit 10 increases toward the bottom and decreases toward the top.

When a measurement value from the vehicle height sensor 180 which measures a height of the vehicle body 6 is expressed as x in the first table M1, the first line S1 that slopes right downward is obtained.

In the control unit 150, through the first table M1, a plurality of input values from the vehicle height sensor 180 are inputted, and a plurality of first lines S1 corresponding to the input values from the vehicle height sensor 180 are stored.

As illustrated in FIGS. 51 and 52, in the control unit 150, there is stored a second table M2 in which, when X data indicates an increase in the load of the vehicle body 6 and Y data indicates an increase in the displacement of the output unit 10, the same value from the hydraulic pressure measurement unit 140 represents a second line S2 that slopes left downward.

In the second table M2, a value of the hydraulic pressure measurement unit 140 is largest at the right bottom end, and is smallest at the left top end.

In the second table M2 in accordance with the exemplary embodiment, X data as horizontal data indicates an increase in the load of the vehicle body 6, and increases in the unit of 50 kg from left to right. In the second table M2, Y data as vertical data indicates an increase in the displacement of the output unit 10, and the displacement of the output unit 10 gradually increases from the top toward the bottom.

In the control unit 150, through the second table M2, a plurality of input values from the hydraulic pressure measurement unit 140 are inputted, and a plurality of second lines S2 corresponding to the input values from the hydraulic pressure measurement unit 140 are stored.

When a measurement value from the hydraulic pressure measurement unit 140 is expressed as y in the second table M2, the second line S2 that slopes left downward is obtained.

In the device 1 for adjusting a height of a vehicle in accordance with the exemplary embodiment, the control unit 150 may calculate a displacement of the output unit 10 and a load of the vehicle body 6, by using measurement values from the vehicle height sensor 180 and the hydraulic pressure measurement unit 140.

The control unit 150 selects a corresponding first line S1 in the first table M1 based on a measurement value from the vehicle height sensor 180, and selects a corresponding second line S2 in the second table M2 based on a measurement value from the hydraulic pressure measurement unit 140.

The control unit 150 may calculate a displacement of the output unit 10 and a load change of the vehicle body 6, by calculating an intersection of the first line S1 and the second line S2 which are selected.

To this end, the control unit 150 stores tables indicating displacements of the output unit 10 and load increases of the vehicle body 6. In the first table M1, a first line S1 which is defined by connecting the same measurement value from the vehicle height sensor 180 is set for each measurement value from the vehicle height sensor 180.

In the second table M2, a second line S2 which is defined by connecting the same measurement value from the hydraulic pressure measurement unit 140 is set for each measurement value from the hydraulic pressure measurement unit 140.

The first line S1 is drawn in a right downward direction, and the second line S2 is drawn in a left upward direction.

For example, when a displacement of the output unit 10 is MID and a load change is 0 kg in the first table M1, by assuming that a value from the vehicle height sensor 180 is x, if a displacement of the output unit 10 is 5 mm and a load value is 100 kg, a vehicle height decreases and a value from the vehicle height sensor 180 is obtained as x.

Further, when a displacement of the output unit 10 is MID and a load change is 0 kg in the second table M2, by assuming that a measurement value from the hydraulic pressure measurement unit 140 is y, if a displacement of the output unit 10 is −5 mm and a load of the vehicle body 6 is 100 kg, a measurement value from the hydraulic pressure measurement unit 140 is obtained as y.

The control unit 150 selects a first line S1 which has the same or similar value, in the stored first table M1, based on a measurement value from the vehicle height sensor 180. The control unit 150 selects a second line S2 which has the same or similar value, in the stored second table M2, based on a measurement value from the hydraulic pressure measurement unit 140.

By calculating a point where the first line S1 and the second line S2 intersect with each other, a load of the vehicle body 6 and a displacement of the output unit 10 are estimated.

Since a displacement of the output unit 10 and a load change of the vehicle body 6 may be measured by using the hydraulic pressure measurement unit 140 and the vehicle height sensor 180 instead of the displacement sensor 160 and a load sensor of the device 1 for adjusting a height of a vehicle, the manufacturing cost may be reduced due to a reduction in the number of parts, and, since a weight change of the vehicle body 6 may be estimated, assistance may be provided to the dynamic behavior of a vehicle.

As is apparent from the above descriptions, according to the exemplary embodiment of the disclosure, the number of parts of a vehicle height adjustment system may be reduced as compared to the conventional art, and thereby, the manufacturing cost may be reduced. Also, since a displacement of the output unit 10 and a load change of the vehicle body 6 may be measured based on measurement values from the vehicle height sensor 180 and the hydraulic pressure measurement unit 140, the manufacturing cost may be reduced.

Further, since the rotation of the damper rod part 22, the piston part 27 and the vehicle piston part 62 is prevented or reduced, the durability of parts which are brought into contact with the damper rod part 22, the piston part 27 and the vehicle piston part 62 may be improved. Moreover, since the rotation of the damper rod part 22, the piston part 27 and the vehicle piston part 62 is prevented or reduced and thus unnecessary behavior is prevented or reduced, the driving safety of a vehicle may be improved.

In addition, by providing the stiffness adjustment unit 200, vehicle stiffness may be changed in conformity with a height of the vehicle body 6, and thus, ride quality and driving stability may be increased. Besides, since stiffness is increased in the case where the vehicle body 6 is in the high mode and the low mode and is decreased in the case where the vehicle body 6 is in the mid mode, ride quality and driving stability may be increased.

Furthermore, since the input piston part 113 and the lead screw 107 are fastened as the first locking member 116 or the second locking member 117 is locked in the horizontal direction in a state in which the input piston part 113 and the lead screw 107 are brought into contact with each other, a sealing member 204 may be omitted, the number of parts may be reduced, and the manufacturing cost may be reduced.

Also, in the case where the working fluid 4 stored in the input unit 100 leaks, since the working fluid 4 stored in the tank part 132 flows into the input unit 100 and thus automatically replenishes the working fluid 4, the durability of the device 1 for adjusting a height of a vehicle may be improved.

Further, according to the exemplary embodiment of the disclosure, since the control unit 150 which receives a measurement value from the hydraulic pressure measurement unit 140 calculates a displacement of the output unit 10, a separate sensor for measuring a displacement of the output unit 10 may be omitted, and thereby, the manufacturing cost may be reduced.

According to the exemplary embodiments of the disclosure, the vehicle height adjustment system may have reduced number of parts compared to the conventional art, and thereby, the manufacturing cost may be reduced.

Also, according to the exemplary embodiments of the disclosure, a rotational movement of a piston part may be suppressed, the durability of parts brought into contact with the piston part may be improved.

Further, according to the exemplary embodiments of the disclosure, unnecessary behaviors of the piston part such as the rotational movement may be suppressed, and therefore, the driving safety of the vehicle may be improved.

Although exemplary embodiments of the present disclosure have been shown and described hereinabove, the present disclosure is not limited to specific exemplary embodiments described above, but may be various modified by those skilled in the art to which the present disclosure pertains without departing from the scope of the disclosure as disclosed in the accompanying claims. In addition, such modifications should also be understood to fall within the scope of the present disclosure.

What is claimed is:

1. A vehicle height adjustment system, comprising:
a cylinder housing part having an inner space configured to receive working fluid;
a piston part positioned in the cylinder housing part, the piston part configured to move linearly, in response to a working fluid, in a moving direction along the cylinder housing part; and
a rotation suppressing bracket coupled to the cylinder housing part and connected to a side surface of the piston part, the rotation suppressing bracket configured to suppress rotational movement with respect to the moving direction of the piston part,
wherein the piston part comprises:
a piston body positioned in the cylinder housing part and configured to move linearly in the moving direction; and
a side engagement groove part formed on a side surface of the piston body having a groove shape extending along the moving direction of the piston body,
wherein the rotation suppressing bracket comprises:
a bracket body having a shape of a ring which is brought into contact with an end of the cylinder housing part; and
a first engagement protrusion extending from the bracket body and inserted into the side engagement groove part,
wherein the cylinder housing part comprises a fastening groove part formed on the end of the cylinder housing part, and
wherein the rotation suppressing bracket further comprises: a second engagement protrusion extending from the bracket body, and inserted into and engaged in the fastening groove part.

2. The vehicle height adjustment system according to claim 1, wherein the first engagement protrusion comprises a plurality of first engagement protrusion parts extending from the bracket body.

3. The vehicle height adjustment system according to claim 1, wherein the second engagement protrusion comprises a plurality of second engagement protrusion parts extending from the bracket body.

4. The vehicle height adjustment system according to claim 1, further comprising:
an output cover fastened to the cylinder housing part while surrounding the rotation suppressing bracket.

5. The vehicle height adjustment system according to claim 1, further comprising a damper rod, the damper rod comprising a protrusion part protruding from the damper rod,
wherein the piston part further comprising a guide part formed to have a groove shape facing the protrusion part, and
wherein the protrusion part is inserted into the guide part.

6. The vehicle height adjustment system according to claim 5, wherein the protrusion part inserted into the guide part is configured to suppress rotational movement of the damper rod with respect to the moving direction.

7. A vehicle height adjustment system, comprising:
an output unit connected to a vehicle body for reducing vibration, the output unit configured to change its length in response to transfer of working fluid to adjust a height of the vehicle body with respect to ground;
a connection pipe connected to the output unit; and
an input unit connected to the connection pipe, the input unit configured to supply the working fluid to the output unit through the connection pipe,
wherein the output unit comprises:
a cylinder housing part having an inner space configured to receive the working fluid;
a piston part positioned in the cylinder housing part, the piston part configured to move linearly in a moving direction in response to the working fluid transferred to the cylinder housing part; and
a rotation suppressing bracket coupled to the cylinder housing part, the rotation suppressing bracket comprising a first engagement protrusion formed on the side surface of the rotation suppressing bracket,
wherein the piston part comprises:
a piston body positioned in the cylinder housing part and configured to move linearly in the moving direction; and
a side engagement groove part formed on a side surface of the piston body having a groove shape and extending along the moving direction of the piston body, the first engagement protrusion of the rotation suppressing bracket being inserted into the side engagement groove part, wherein the rotation suppressing bracket comprises a bracket body having a shape of a ring which is brought into contact with an end of the cylinder housing part; and wherein the first engagement protrusion extends from the bracket body, wherein the cylinder housing part comprises a fastening groove part formed on the end of the cylinder housing part, and wherein the rotation suppressing bracket further comprises a second engagement protrusion extending from the bracket body, and inserted into and engaged in the fastening groove part.

8. The vehicle height adjustment system according to claim 7, wherein the output unit comprises at least one of:
   a front wheel output unit configured to adjust a height of a front wheel-side vehicle body; and
   a rear wheel output unit configured to adjust a height of a rear wheel-side vehicle body.

9. The vehicle height adjustment system according to claim 7, wherein the input unit comprises:
   an input piston housing part containing the working fluid; and
   an input piston part configured to move in a vertical direction to transfer the working fluid between the input unit and the output unit.

10. The vehicle height adjustment system according to claim 9, wherein the input unit further comprises:
   a driving part configured to generate rotational power for driving the input piston; and
   a reduction part connected between the driving part and the input piston, the reduction part configured to generate a torque by increasing the rotational power of the driving part and transmit the torque to the input piston part.

11. The vehicle height adjustment system according to claim 10, wherein the input unit further comprises:
   a lead nut part configured to receive the torque from the reduction part and rotate in response to the received torque; and
   a lead screw rotatably coupled to the lead nut part and connected to the input piston part,
   wherein the lead screw is configured to move in the vertical direction in response to the rotation of the lead nut part to move the input piston part in the vertical direction.

12. The vehicle height adjustment system according to claim 7, further comprising a replenishment unit connected to the input unit, the replenishment unit configured to supply the working fluid into the input unit.

13. The vehicle height adjustment system according to claim 12, further comprising a supply pipe connected between the input unit and the replenishment unit,
   wherein the replenishment unit is configured to supply the working fluid into the input unit through the supply pipe in response to a negative pressure formed in the input unit due to a leakage of the working fluid from operation.

* * * * *